(12) United States Patent
Okada et al.

(10) Patent No.: US 6,918,854 B2
(45) Date of Patent: Jul. 19, 2005

(54) METHOD AND SYSTEM FOR CONTROLLING CREEP IN AUTOMATIC TRANSMISSION

(75) Inventors: Takashi Okada, Hitachi (JP); Toshimichi Minowa, Mito (JP); Mitsuo Kayano, Fukuoka (JP); Tatsuya Ochi, Naka (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/253,474

(22) Filed: Sep. 25, 2002

(65) Prior Publication Data
US 2003/0171186 A1 Sep. 11, 2003

(30) Foreign Application Priority Data
Mar. 7, 2002 (JP) ........................................ 2002-061894

(51) Int. Cl.$^7$ .............................................. F16H 61/20
(52) U.S. Cl. ......................................... 477/114; 477/93
(58) Field of Search ................... 477/93, 114; 180/170, 180/171; 701/93

(56) References Cited

U.S. PATENT DOCUMENTS

| | | | | |
|---|---|---|---|---|
| 4,885,960 A | * | 12/1989 | Maeda et al. | 477/114 |
| 4,969,103 A | * | 11/1990 | Maekawa | 701/96 |
| 5,446,351 A | * | 8/1995 | Kusano et al. | 180/170 X |
| 6,358,182 B1 | * | 3/2002 | Eguchi | 477/93 X |
| 6,377,007 B1 | * | 4/2002 | Ozaki et al. | 318/432 |
| 6,569,052 B2 | * | 5/2003 | Sakai et al. | 475/214 |
| 6,599,220 B2 | * | 7/2003 | Narita et al. | 477/37 |
| 2002/0006851 A1 | | 1/2002 | Matsumura | |

FOREIGN PATENT DOCUMENTS

| | | | |
|---|---|---|---|
| EP | 585122 | * | 2/1994 |
| JP | 410166897 | * | 6/1998 |
| JP | 2000-179674 | | 6/2000 |
| JP | 2002-096658 | | 4/2002 |
| JP | 2002-267000 | | 9/2002 |

* cited by examiner

*Primary Examiner*—Ha Ho
(74) *Attorney, Agent, or Firm*—Crowell & Moring LLP

(57) ABSTRACT

A method and system for controlling creep in an automatic transmission, comprising a first creep torque control means which, upon generation of an accelerator- and brake-pedal undepressed state in a running mode, generates a target creep speed, the target creep speed increasing as a function of time and settling to a predetermined value, the first creep torque control means then calculating a creep torque from the target creep speed, detecting a change in vehicle load from a speed deviation, correcting a target creep torque on the basis of the detected change in vehicle load, and controlling the engine torque on the basis of the correction, and a second creep torque control means which controls a transfer torque of a starting clutch (a first friction clutch) on the basis of a slipping speed of the starting clutch and the target creep torque, the creep controlling method and system being able to realize a stable creep running even against a change in running environment such as the existence of a slope or an increase of payload while suppressing wear and heat generation of the friction clutch.

19 Claims, 23 Drawing Sheets

FIG.3
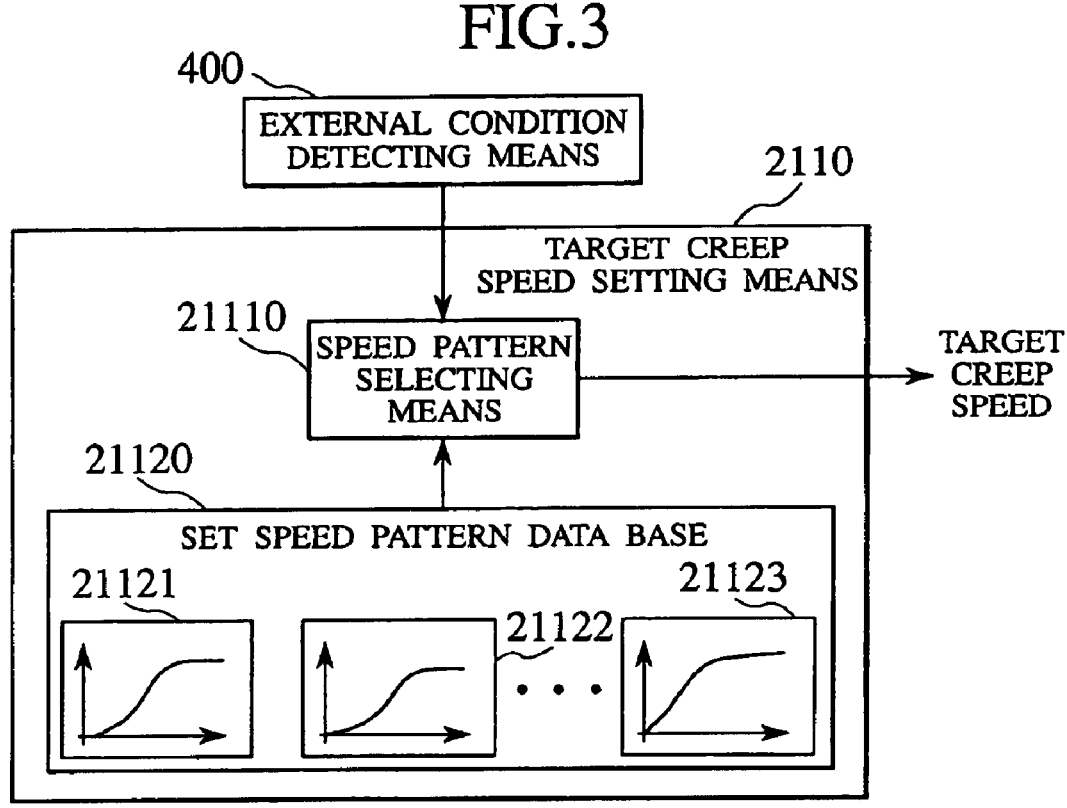
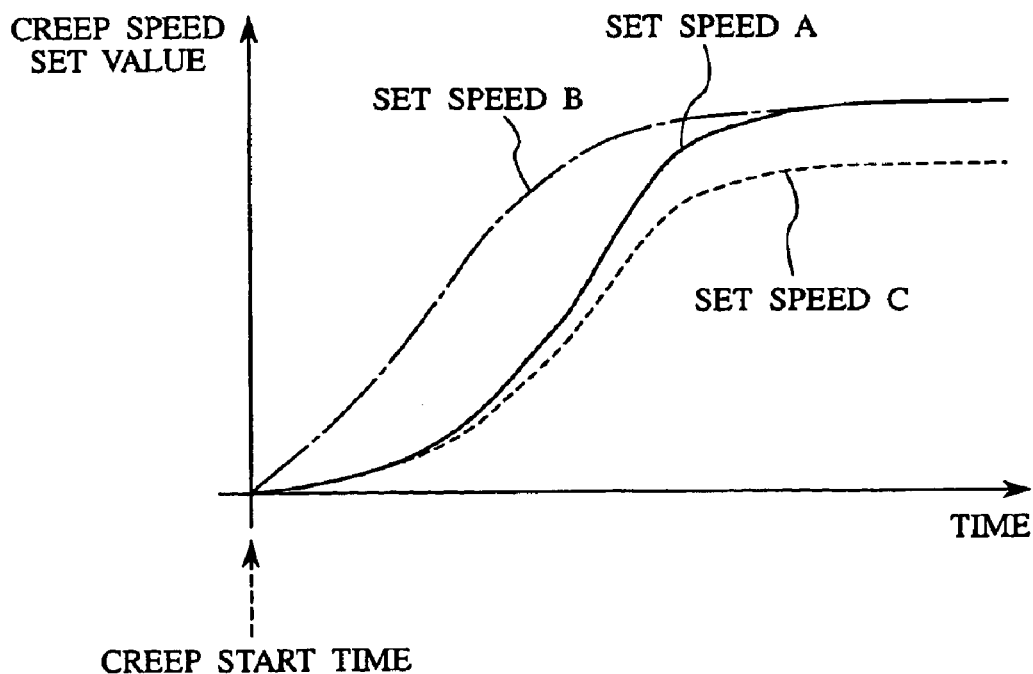

FIG.9
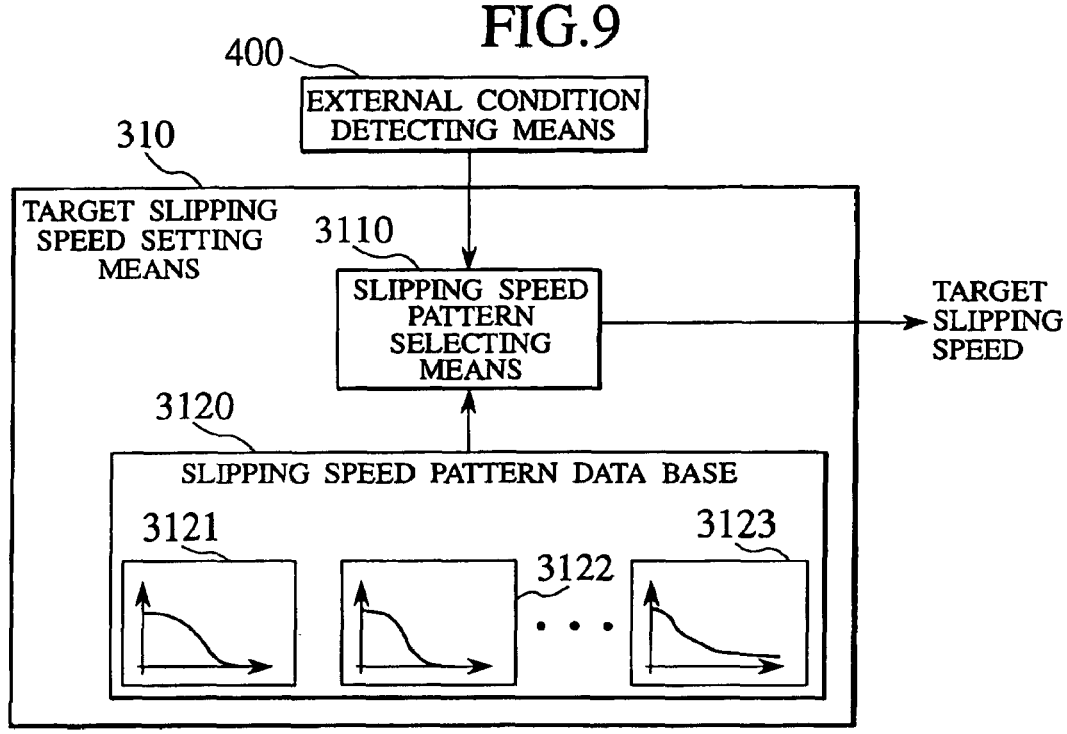
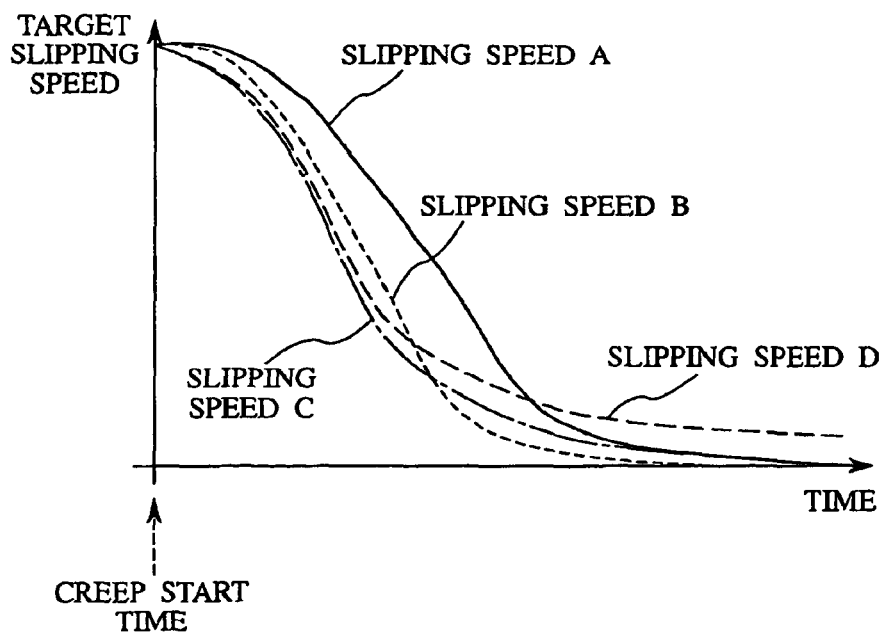

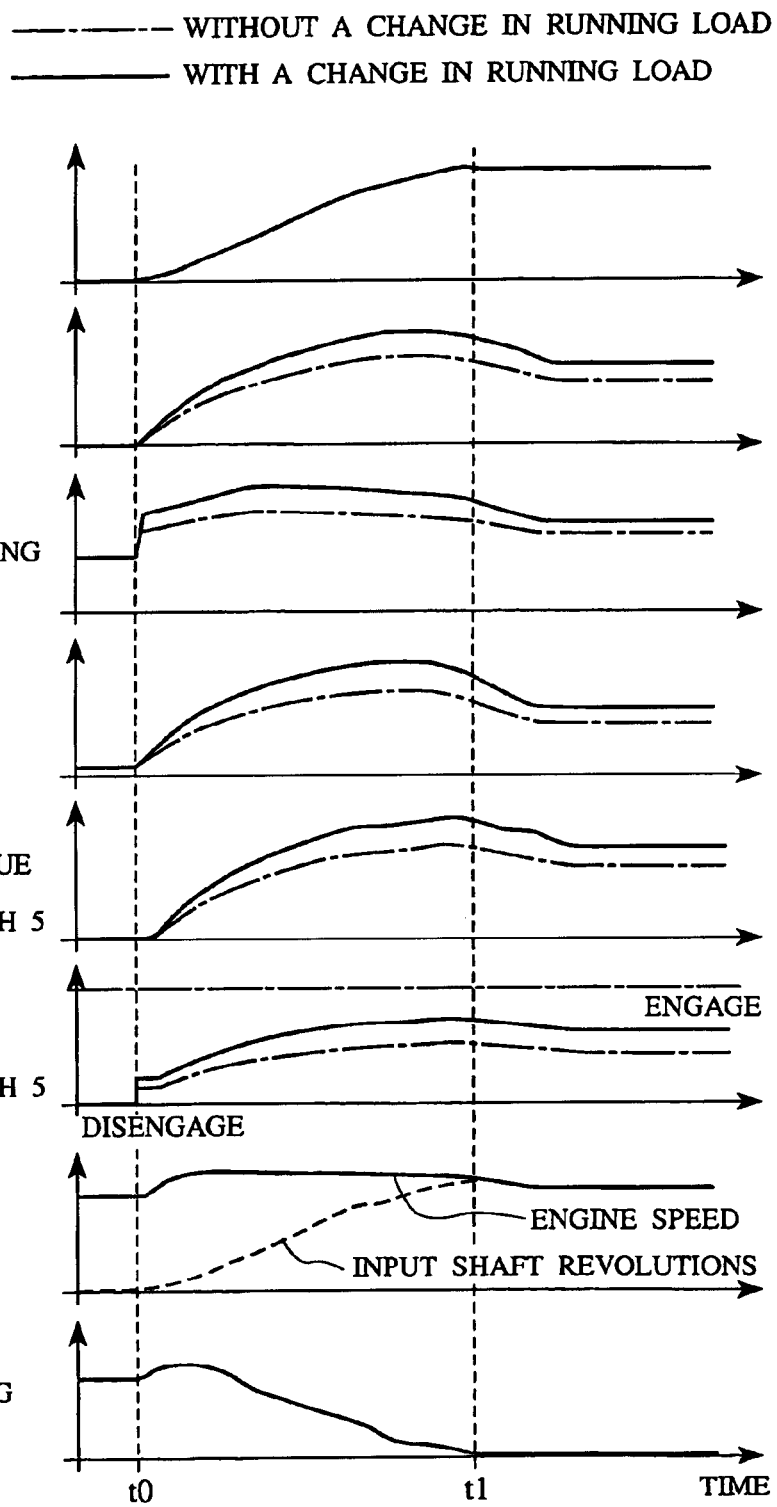

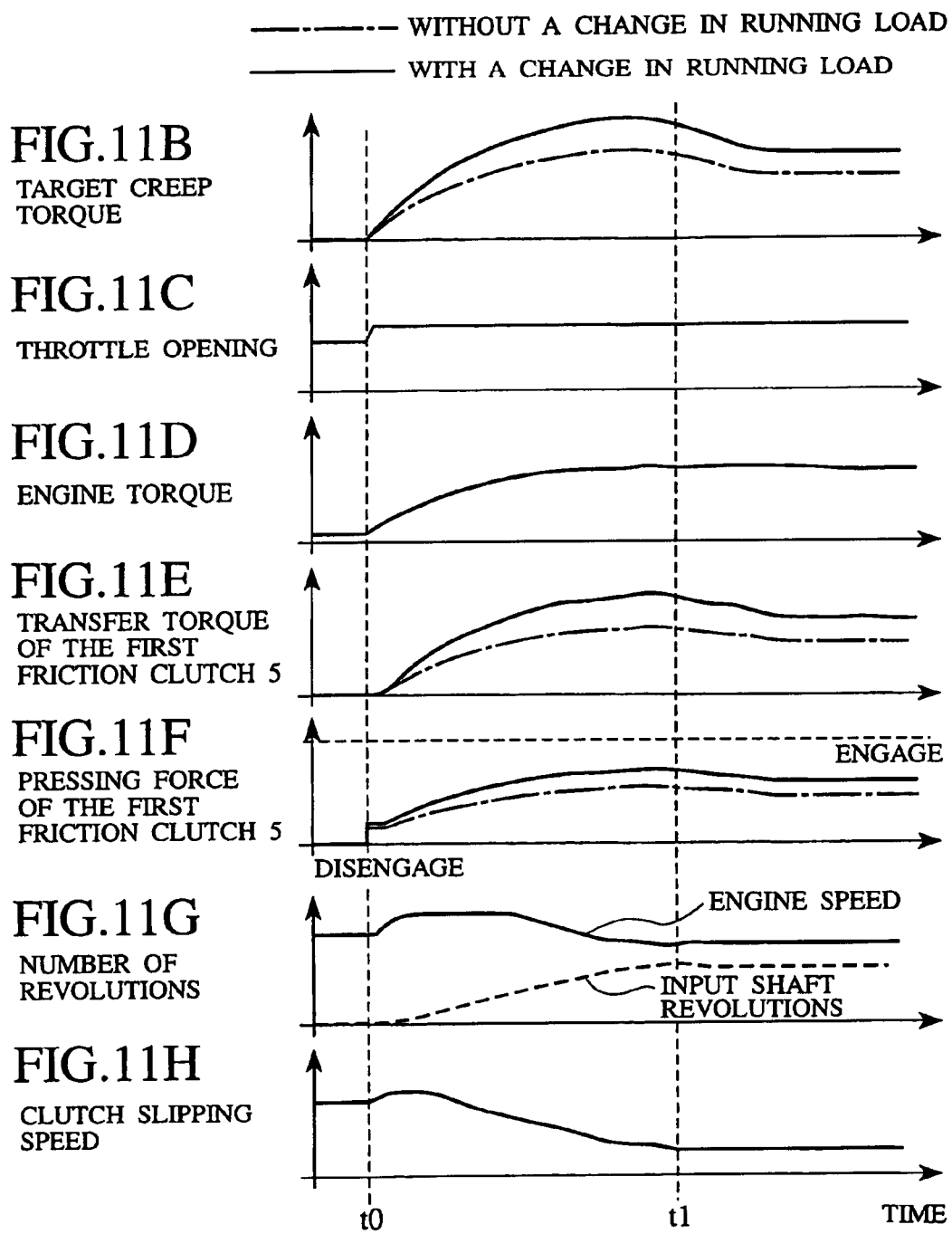

TARGET CREEP SPEED

TARGET CREEP TORQUE

THROTTLE OPENING

ENGINE TORQUE

TRANSFER TORQUE OF THE FIRST FRICTION CLUTCH 5

PRESSING FORCE OF THE FIRST FRICTION CLUTCH 5

ENGAGE

DISENGAGE

NUMBER OF REVOLUTIONS

ENGINE SPEED
INPUT SHAFT REVOLUTIONS

CLUTCH SLIPPING SPEED t0   t1   TIME

TARGET CREEP SPEED

TARGET CREEP TORQUE

THROTTLE OPENING

ENGINE TORQUE

TRANSFER TORQUE OF THE FIRST FRICTION CLUTCH 5

PRESSING FORCE OF THE FIRST FRICTION CLUTCH 5

NUMBER OF REVOLUTIONS

CLUTCH SLIPPING SPEED

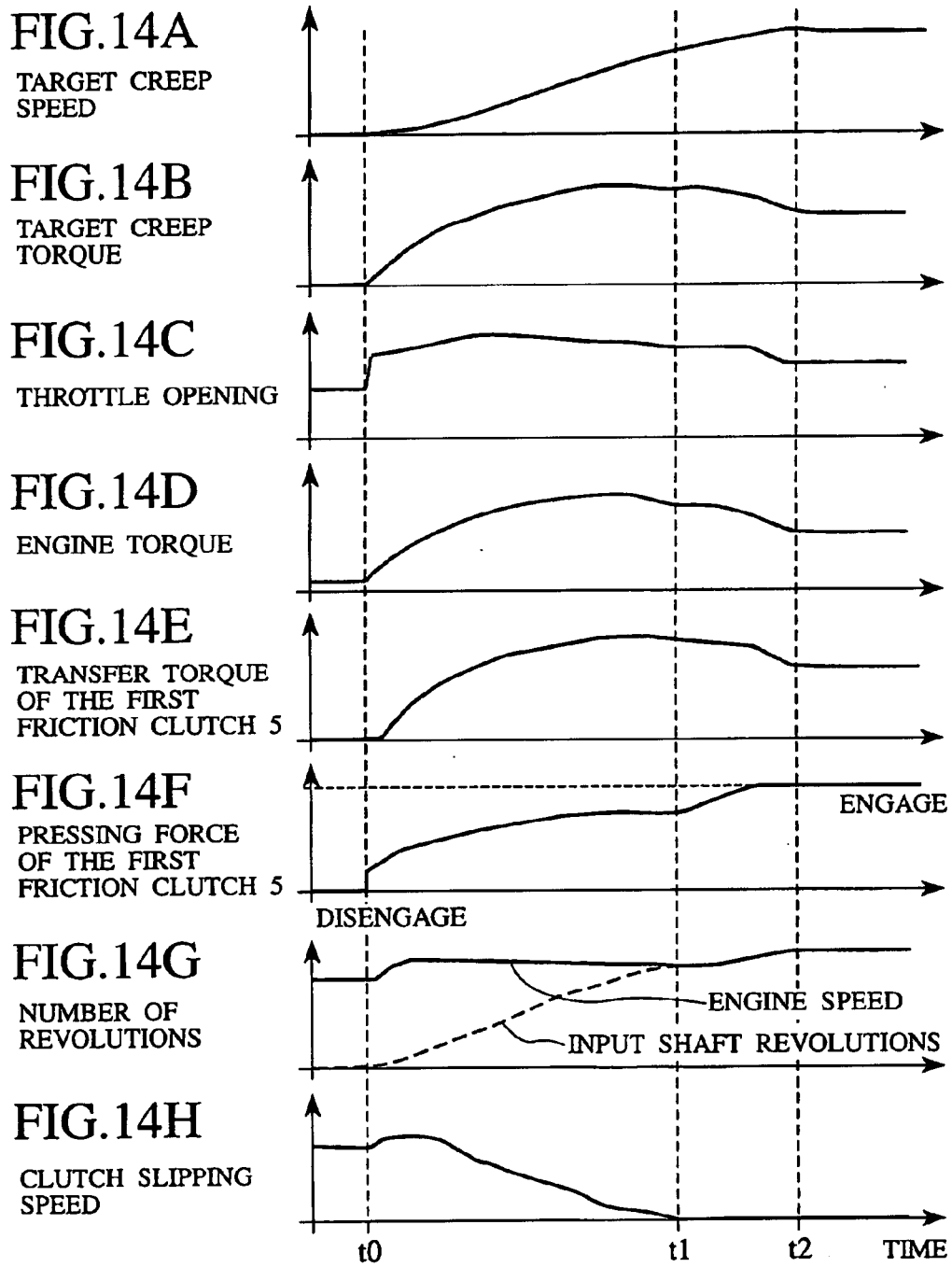

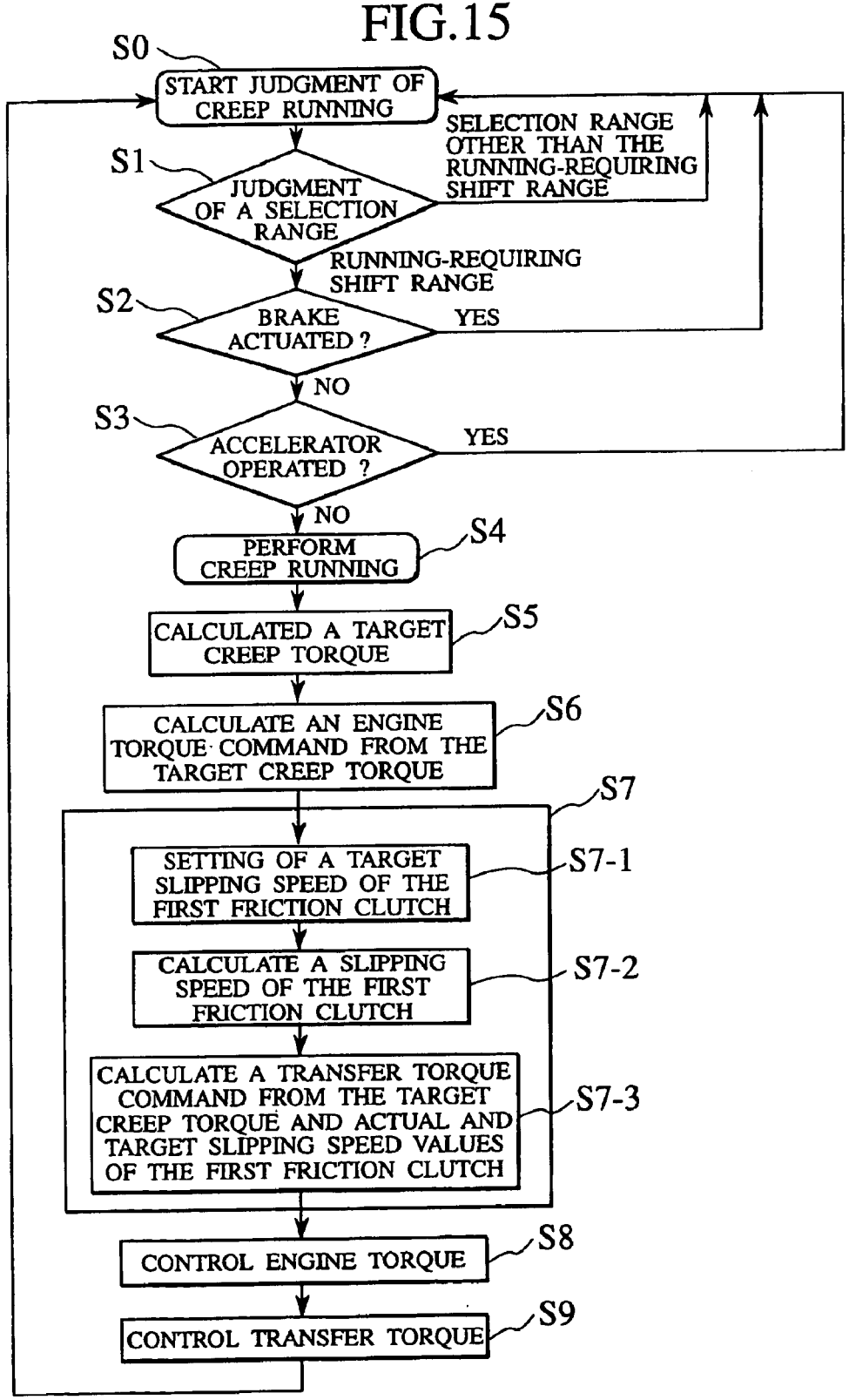

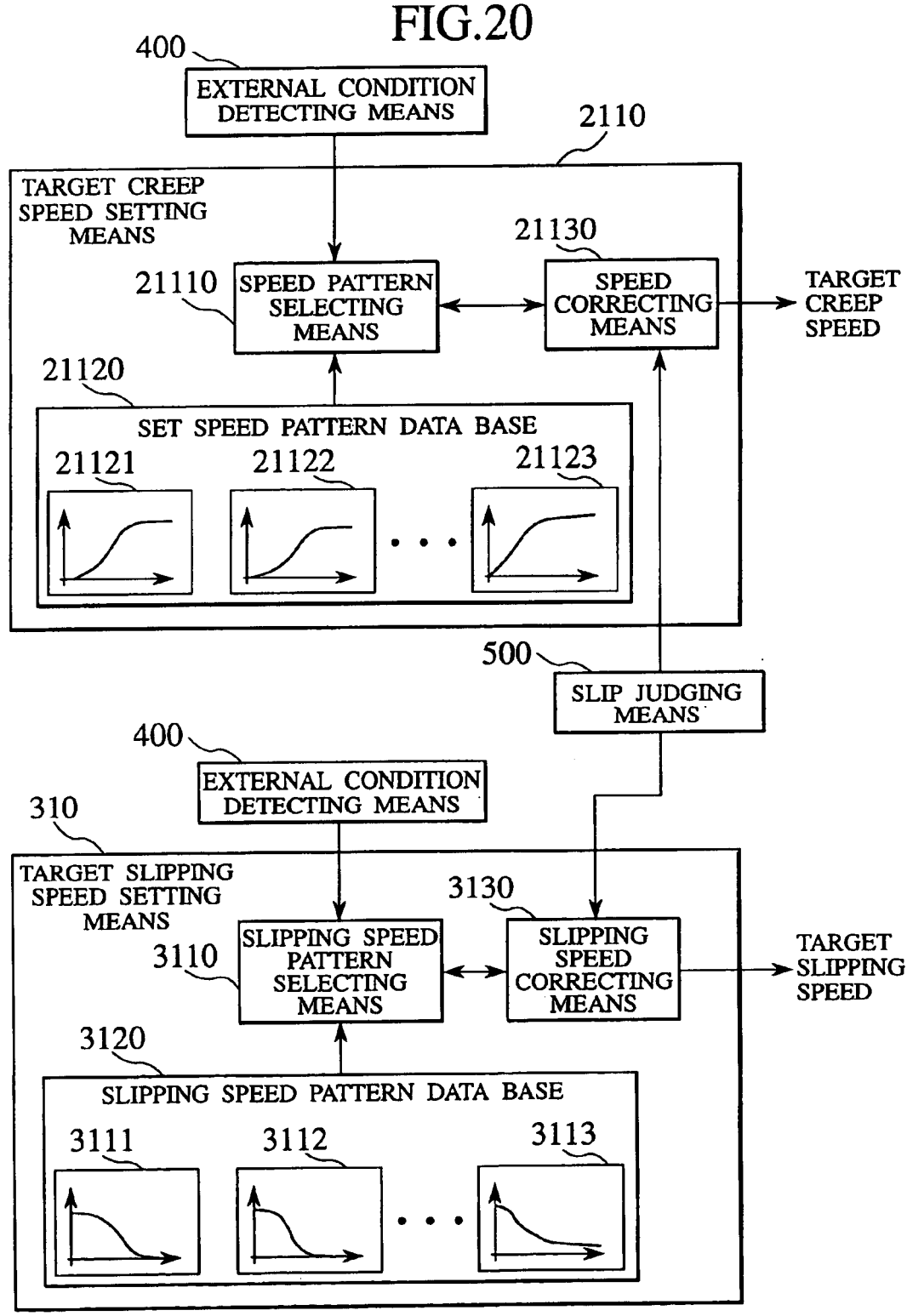

TARGET CREEP SPEED

TARGET CREEP TORQUE

THROTTLE OPENING

ENGINE TORQUE

TRANSFER TORQUE OF THE FIRST FRICTION CLUTCH 5

PRESSING FORCE OF THE FIRST FRICTION CLUTCH 5

NUMBER OF REVOLUTIONS

CLUTCH SLIPPING SPEED

METHOD AND SYSTEM FOR CONTROLLING CREEP IN AUTOMATIC TRANSMISSION

BACKGROUND OF THE INVENTION

1. Field of the Invention

The present invention relates to a method and system for controlling creep in an automatic transmission.

2. Related Art

In a vehicular transmission having a starting clutch (a torque transfer mechanism) which uses an intermeshing type transmission to engage and disengage a prime mover (hereinafter referred to as "engine") and a transmission with and from each other, if a creep torque is to be controlled with a transfer torque of the starting clutch, since the torque transfer is realized in a slipping state of the starting clutch, there arises a great change in the transfer torque due to wear of the starting clutch and due to an increase of temperature caused by the wear. In an effort to avoid this inconvenience there has been proposed a method of controlling the slipping speed of the clutch (Japanese Patent Laid Open No. 7-77226), a method in which a required torque is estimated from both clutch torque and vehicle speed and the transfer torque of the clutch is controlled thereby (Japanese Patent Laid Open No. 2000-186726), and a method in which when creep starts, the engine torque is increased by only a predetermined value or up to a rated value and at the same time the transfer torque of the starting clutch is controlled (Japanese Patent Laid Open Nos. 10-71877 and 4-159873).

In the above conventional method wherein the transfer torque of the starting clutch is increased to control the creep torque, the vehicle load varies according to the state of vehicular running environment (slope and an increase of payload) and there arises a decrease in the number of revolutions of the engine, i.e., engine speed. In this case, in an engine controller there is performed an idling speed control for keeping the engine speed constant, thus giving rise to the problem that there occurs engine vibration as the running load increases and a required creep torque cannot be controlled freely. Further, according to the method wherein the engine torque is increased by a predetermined value or up to a rated value, there sometimes occurs a case where it is difficult to suppress the generation of heat from the starting clutch.

SUMMARY OF THE INVENTION

It is an object of the present invention to provide a method and system for controlling a vehicular creep in a vehicular transmission having a starting clutch (a torque transfer mechanism) which method and system can realize a stable creep running and suppress wear of the clutch and an increase of temperature caused by the wear even when the running environment varies (slope and an increase of payload).

BRIEF DESCRIPTION OF THE DRAWINGS

FIG. 3 is a block diagram of a target creep speed setting means shown in FIG. 2;

FIG. 9 is a block diagram of a target slipping speed setting means;

FIGS. 10 A–H are time charts of creep controlling operations according to the present invention;

FIGS. 11 A–H are time charts showing an example of conventional creep controlling operations;

FIGS. 14 A–H are time charts of creep controlling operations according to the present invention;

FIG. 15 is a flow chart of a vehicular creep control processing according to the present invention;

FIG. 20 illustrates a target creep speed setting means and a target slipping speed setting means both embodying the present invention;

DESCRIPTION OF THE PREFERRED EMBODIMENTS

Figure 1:
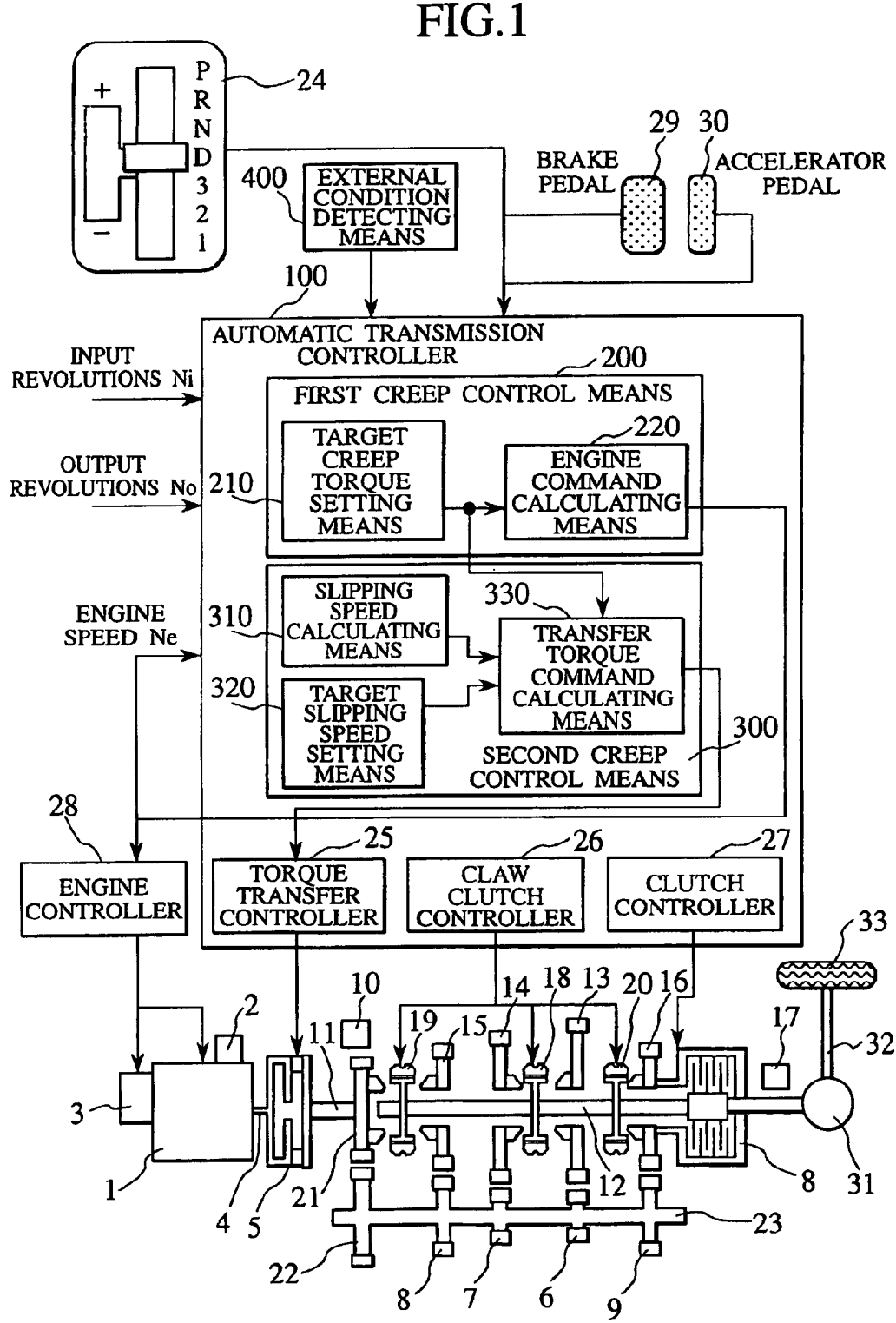
FIG. 1 is an entire construction diagram of a creep control system according to an embodiment of the present invention.

According to the present invention, when a creep torque generating state, e.g., a brake-released, accelerator-undepressed state with a shift lever lying in a running range, is detected, there is generated a target creep speed which rises from that instant, and a control is made to let the vehicle speed follow the target creep speed. For example, the invention is characterized by controlling the torque of an engine and the transfer torque of a torque transfer mechanism (e.g., a starting clutch). Preferably, the engine torque is controlled on the basis of a target torque required for allowing the vehicle speed follow the target creep speed. On the other hand, the transfer torque of the torque transfer mechanism is controlled on the basis of a difference between the number of revolutions on an input side and that on an output side of the torque transfer mechanism and the target torque.

The present invention is firstly characterized in that a required target creep torque is calculated and the engine torque is controlled on the basis of this target creep torque. Secondly, a slipping speed of a torque transfer mechanism (e.g., a starting clutch) disposed between the engine and the transmission is calculated on the basis of a difference between the number of revolutions on an input side and that on an output side of the torque transfer mechanism, and the transfer torque of the torque transfer mechanism is controlled on the basis of the slipping speed and the target creep torque.

In the present invention, moreover, a required target creep torque is calculated from a target creep speed, or a target creep torque is determined by calculating a torque correction quantity against a vehicular running load, and the engine torque is controlled. Next, a slipping speed of a torque transfer mechanism disposed between the engine and the transmission is calculated on the basis of a difference between the number of revolutions on an input side and that on an output side of the torque transfer mechanism, and the transfer torque of the torque transfer mechanism is controlled on the basis of the slipping speed and the target creep torque. With this control, even in the event the vehicular running condition changes, such as the appearance of a road slope or a change in vehicular payload and weight, a stable creep running of the vehicle is attained while suppressing wear and heat generation of the torque transfer mechanism.

According to the present invention, a method of controlling creep of a vehicle, which includes a torque transfer mechanism for transferring a torque of a prime mover to a transmission and a shift range operating unit, comprises the steps of: detecting the states where a lever of the shift range operating unit lies in a vehicle running range, a brake is released, and an accelerator pedal is not depressed; and controlling the torque of the prime mover and the transfer torque of the torque transfer mechanism so that a vehicle speed attains a predetermined creep speed or in response to a running load of the vehicle.

In addition, according to the present invention, an apparatus for controlling creep of a vehicle, which includes a prime mover, a torque transfer mechanism for transferring a torque of the prime mover to a transmission, and a shift range operating unit, comprises a creep initiation detection unit for detecting the states where a lever of the shift range operating unit lies in a vehicle running range, a brake is released, and an accelerator pedal is not depressed; and a creep torque control unit for controlling the transfer torque of the torque transfer mechanism and the torque of the prime mover so that a vehicle speed is set close to a predetermined creep speed or in response to a running load of the vehicle.

FIG. 1 is an entire construction diagram of a vehicular creep control system according to an embodiment of the present invention. In an engine 1 there are provided an engine speed sensor 2 for measuring the number of revolutions Ne of the engine 1 and an electronic controlled throttle valve 3 for adjusting the engine torque, whereby the torque of the engine 1 can be controlled with a high accuracy. More specifically, the amount of intake air is controlled by the electronic controlled throttle valve 3 which is provided in an intake pipe (not shown) and fuel is injected in an amount matching the controlled amount of intake air from a fuel injection system (not shown). An ignition timing is determined in accordance with signals indicative of an air-fuel ratio determined from the amount of air and that of fuel, as well as the engine speed Ne, and ignition is performed by an ignition device (not shown).

As the fuel injection system there is adopted either an intake port injection type or an intra-cylinder direction injection type in comparison with respective required drive ranges (ranges determined by engine torque and engine speed) and in accordance with whether fuel consumption can be decreased and exhaust performance is superior.

A first friction clutch (a torque transfer portion called a starting clutch) 5 for transferring the torque of the engine 1 to an input shaft 11 of a transmission is mounted on an engine shaft 4. As the first friction clutch 5 there generally is used a dry type single plate clutch, but there also may be used any of various other friction clutches, including a wet type multiple disc clutch and an electromagnetic clutch. A driving gear 21 is mounted on the input shaft 11. A counter gear 22 meshing with the driving gear 21 is fixed onto a counter shaft 23. Further mounted on the counter shaft 23 are first to third driving gears 6~8 and an assist driving gear 9. Although the transmission is provided with the counter shaft 23 in addition to the input and output shafts, the counter shaft 23 may be omitted.

A torque transfer controller 25 is provided for controlling a pressing force (clutch transfer torque) of the first friction clutch 5. By adjusting the pressing force (clutch transfer torque) of the first clutch 5 with the torque transfer controller 25 it is possible to make and break the transfer of power from the engine shaft 4 of the engine 1 to the input shaft 11 and adjust the amount of torque to be transferred.

Any of the first to third driving gears 6~8 and assist driving gear 9 on the counter shaft 23 is also used for detecting the number of revolutions Ni of the input shaft 11. More specifically, near any of the driving gears 6~9 there is provided a sensor 10 for detecting the number of revolutions of the associated driving gear and thereby detecting the number of revolutions of the counter shaft 23. The number of revolutions Ni of the input shaft 11 is detected using an output of the sensor 10 and also using a gear ratio between the driving gear 21 on the input shaft 11 and the counter gear 22 on the counter shaft 23. Alternatively, it is also possible to detect the number of revolutions of the input shaft 11 from the number of revolutions of the driving shaft 21 mounted on the input shaft.

On the other hand, on an output shaft 12 of the transmission there are mounted first to third driven gears 13~15 and an assist driven gear 16 rotatably. The first to third and assist driven gears 13~16 are in mesh with the first to third and assist driving gears 6~9, respectively.

A rotating torque of the input shaft 11 is transferred to the counter shaft 23 through the driving gear 21. For transferring the rotating torque of the counter shaft 23 to the output shaft 12, a claw clutch 18 may be moved axially of the output shaft 12 into mesh with the first or second driven gear 13 or 14. On the output shaft 12 is mounted a revolution sensor 17 for detecting the number of revolutions of the output shaft.

For transferring the rotating torque of the input shaft 11 to the output shaft 12, a claw clutch 19 may be moved axially of the output shaft 12 into mesh with the third driven gear 15 or the input shaft 11. For moving the claw clutches 18 and 19 there is provided a claw clutch controller 26. The claw clutch controller 26 may use an oil pressure or a motor to actuate the claw clutches.

A top gear can be obtained by a directly coupled state from the input shaft 11 to the output shaft 12. Further, by providing a pair of gears engaged between the counter shaft 23 and the output shaft 12 it is also possible to obtain a transmission having overtop gear shift ranges.

The assist driven gear 16 is provided so as to be engaged with and disengaged from the output shaft 12 through a second friction clutch 8. More specifically, a clutch plate is fixed to the assist driven gear 16 which is mounted on the output shaft 12 rotatably, and a clutch plate is also fixed to the output shaft 12. The clutch plates are pushed to create a frictional force and with this frictional force the assist driven gear 16 is engaged with or disengaged from the output shaft 12. Each of the clutch plates may comprise plural clutch plates or may be a single clutch plate. Preferably there is used a multiple disc friction clutch for increasing the torque transfer capacity of the friction clutch. Further, a wet type friction clutch with oil interposed between the clutch plates and a dry type friction clutch without oil not interposed therebetween are available, but preferably there is used the wet type friction clutch from the standpoint of controllability for the clutch transfer torque.

A clutch controller 27 is provided for engagement and disengagement of the second friction clutch 8. The clutch controller 27 controls the clutch transfer torque by controlling the pressing force of the second friction clutch 8. As a drive source for the torque transfer controllers 25 and 27 there may be used an oil pressure or a motor. In case of using an oil pressure, the flow rate or pressure of oil is controlled with a linear solenoid valve, whereby the clutch pressing force can be controlled. In case of using a motor, the pressing force can be controlled by using, for example, a mechanism which transforms the rotating torque of the motor into a linear motion.

The pair of the assist driving gear 9 and the assist driven gear 16, which realize the transfer of torque through the second friction clutch 8, are employable also in normal vehicular running. This can be effected by holding the second friction clutch 8 in a completely engaged state. In this case, the pair of the assist driving gear 9 and the assist driven gear 16 are set equal to any of second, third and top gears for example, whereby it is possible to diminish one pair of gears in the gear shift ranges. In the case where the assist driving gear 9 and the assist driven gear 16 are paired so as to be at a gear ratio different from the gear shift ranges in vehicular running, there may be set a gear ratio corresponding to, for example, 2.5 or 3.5 range. In this case, since a pair of gears equipped with a claw clutch are used during normal running, there is not used power for clamping gears to the shaft and this is advantageous in point of fuel economy.

As shown in FIG. 1, a claw clutch 20 having a synchronizer mechanism for engaging the assist driven gear 16 with the output shaft 12 may be provided in the assist driven gear 16. In this case, a stopper (not shown) is provided in the assist driven gear 16 to prevent the gear from moving axially of the output shaft 12. The claw clutch 20 is formed with grooves (not shown) for engagement with plural grooves (not shown) formed in the output shaft 12 and is movable axially of the output shaft. The rotating torque transmitted from the assist driving gear 9 to the assist driven gear 16 is further transmitted to the output shaft 12 through the claw clutch 20. In such a vehicular running, the running can be effected without engagement of the second friction clutch 8 and hence it is possible to eliminate loss of the same clutch, which is advantageous in point of fuel economy.

Torque can be transmitted in a so-called clutch slipping state in which the first and second friction clutches 5 and 8 are not equal in the number of revolutions between clutch input side and output side. Generally, the torque capable of being transmitted by a friction clutch is described like the following equation:

$$T = \mu \times P \times z \times (D2^3 - D1^3)/\{3 \times (D2^2 - D1^2)\} \quad (1)$$

where, T: transfer torque, $\mu$: friction coefficient of friction material, z: number of frictional face, P: pushing force of frictional face, D2: outside diameter of frictional face, D1: inside diameter of frictional face. That is, the torque T capable of being transmitted can be controlled with the pushing force P of the clutch.

There is case where the friction clutch is pushed beforehand with such an elastic member as a spring to generate a pushing force and there also is a case such a pushing force is not generated in advance. In the latter construction, the friction clutch becomes disengaged in a control-free state, with no generation of transfer torque. In this case, a pushing force is generated to push a friction material against the resistive force of an elastic member such as a spring, thereby effecting the transfer of torque. On the other hand, in the former construction wherein the friction clutch is pushed in advance, the friction clutch becomes engaged in a control-free state and there is obtained a transfer torque proportional to the pushing force of the elastic member. When control is made, a force is exerted in a direction in which the pushing force is relieved, thereby diminishing the pushing force exerted on the friction clutch to adjust the transfer torque. In this way the pushing force can be measured indirectly from a deformation quantity of the elastic member such as a spring. If this deformation quantity is measured as a stroke quantity, it is possible to measure the transfer torque of the friction clutch.

The rotating torque of the input shaft 11 is transmitted from the driving gears 6~9 to the output shaft 12 through the driven gears 13~16 or directly and is then transmitted to an axle 32 through a differential gear 31 to rotate a driving wheel 33.

The electronic controlled throttle valve 3 controls the throttle opening in accordance with a command issued from an engine controller 28. With the electronic controlled throttle valve 3, it is possible to control the engine torque. But the engine torque can also be controlled by changing the ignition timing or changing the amount of fuel through the engine controller 28. The torque transfer controller 25, clutch controller 27 and claw clutch controller 26 are controlled by an automatic transmission controller 100. The engine controller 28 and the automatic transmission controller 100 are connected together through communication such as CAN (Control Area Network). As a result, an engine torque command is outputted from the automatic transmission controller 100 to the engine controller 28, whereby the torque of the engine 1 can be controlled.

In the interior of the automatic transmission controller 100 are provided a first creep control means 200 and a second creep control means 300, which constitute a principal portion of the present invention. The first creep control means 200 calculates a command for controlling the engine 1, while the second creep control means 300 calculates a command for controlling the first friction clutch 5. Though not shown, the automatic transmission controller 100 is provided with means for inputting measured signals such as engine speed Ne, generated torque in the engine, as well as the number of revolutions Ni of the input shaft and the number of revolutions No of the output shaft in the transmission. External environment information pieces such as outside air temperature, meteorological information, and road surface conditions (e.g., slope), are also inputted from an external condition detecting means 400. For example, it is also possible to input meteorological information by utilizing a navigation system and judge the possibility of a frozen road. By so doing, it is possible to perform a creep control in accordance with external environment conditions such as a frozen road, whereby it is possible to effect a such a creep control as prevents the occurrence of slip for example. Moreover, the state of brake operation in the vehicle is inputted from a brake pedal 29 and the state of accelerator operation is inputted from an accelerator pedal 30. Further, the range selected by the driver is inputted from a range operation system 24 such as a shift lever. Creep control is executed in a state in which the shift lever is position in a running range R, D, 3, 2, or 1, the brake is released, and the accelerator pedal is not depressed. There sometimes is a case where there is added a condition that a parking brake P should not be operated. A creep ON-OFF switch may be provided. Further, a condition that the creep operation should not be performed may be added when it is detected by the external condition detecting means that the road surface is a down slope in the vehicular advancing direction, i.e., an up slope in case of R range being selected, or a down slope in case of D (forward such as 3, 2, or 1) range being selected.

Further, when a creep torque of a predetermined value or more is requested, it is judged that the creep torque is an excessively requested torque. In this case, it is possible to preset an upper limit of the target creep torque so as to control the upper limit of the creep torque command.

The first and second creep control means 200, 300 will now be outlined. When there occurs a state in which the shift lever is in a running range R, D, 3, 2, or 1 and the brake pedal 29 is released, with the accelerator pedal 30 being not depressed, the automatic transmission controller 100 generates a creep starting request and starts the creep control. Upon start of the creep control, a target creep setting means 210 disposed within the first creep controller 200 sets a creep torque necessary for the vehicle. As will be described later, a target creep torque may be set on the basis of target creep speed and vehicular inertia, or there may be adopted a method involving estimating a running load from the road gradient detected by the external condition detecting means 400 and correcting the target creep torque. Further, there may be adopted a method involving estimating a change in vehicle weight and correcting the vehicular inertia on the basis of the change in vehicle weight. Thus, by correcting the target creep torque with use of changes in running load which can be anticipated from vehicle information and external environment information, it is possible to effect the creep control in a more accurate manner.

In addition, an upper limit of the target creep torque is set. Thus, when a target creep torque is larger than the set upper limit, it is judged to be an excessive creep torque, making it possible to also control the creep torque.

The target creep torque is outputted to the engine command calculating means 220, in which a command for the engine 1 to generate a preset torque is calculated and outputted to the engine controller 28. By thus making the engine 1 generate a torque necessary for creep, it is possible to prevent a lowering in the number of revolutions of the engine and thereby prevent the occurrence of engine stall. Further, since the creep torque command as a request for the engine 1 is calculated upon starting of creep, it is possible to eliminate "slow feeling" which is ascribable to a delay in response of the engine 1.

The target creep torque set by the target creep torque setting means 210 is fed also to the second creep control means 300. In the second creep control means 300, a transfer torque command calculating means 330 calculates a transfer torque command for the friction clutch 5 on the basis of the target creep torque set by the first creep control means 200. At this time, a slipping speed of the friction clutch 5 is calculated in a slipping speed calculating means 310 and is outputted, together with a target slipping speed set by a target slipping speed setting means 320, to the transfer torque command calculating means 330. The torque command calculating means 330 calculates the transfer torque command while correcting the target creep torque set by the first creep control means 200 on the basis of a deviation from the target value of slipping speed. In this way the friction clutch 5 not only transmits the target creep torque to the transmission but also controls its own slipping speed. Consequently, it is possible to adjust the state of wear of the friction clutch 5 and prevent excessive wear. Preferably, in the second creep control means 300, the slipping speed of the friction clutch 5 is decreased gradually while realizing the target creep torque set by the first creep control means 200. By allowing the slipping speed to reach zero there is attained a stable creep running while minimizing the slip of the friction clutch 5.

Thus, according to this embodiment, by controlling the torque of the engine 1 and the transfer torque of the friction clutch 5 on the basis of the target creep torque which is set, there can be attained a stable creep control while avoiding a deficiency of the creep torque caused by a decrease of the engine speed.

Besides, since a target slipping speed of the friction clutch 5 is set and the transfer torque of the friction clutch 5 is controlled in accordance with both actual slipping speed of the friction clutch and the target slipping speed, it is possible to prevent excessive slip of the friction clutch 5 and hence possible to suppress the wear thereof.

In addition, when the magnitude of the target creep torque is in excess of a preset upper limit creep torque, it is judged to be an excessive creep torque, and thereby it is possible to control the creep torque. In this case, proper setting of a target slip speed of the friction clutch 5 permits to control the creep torque without engine stop caused due to decreased engine speed. When slip of the friction clutch 5 continues for a period of time, a deterioration due to heat generation is produced. Therefore, it is necessary to stop a torque transferring operation by eliminating creep control. Then, by issuing a warning to a driver, it is possible to present the abnormal state.

Figure 2:
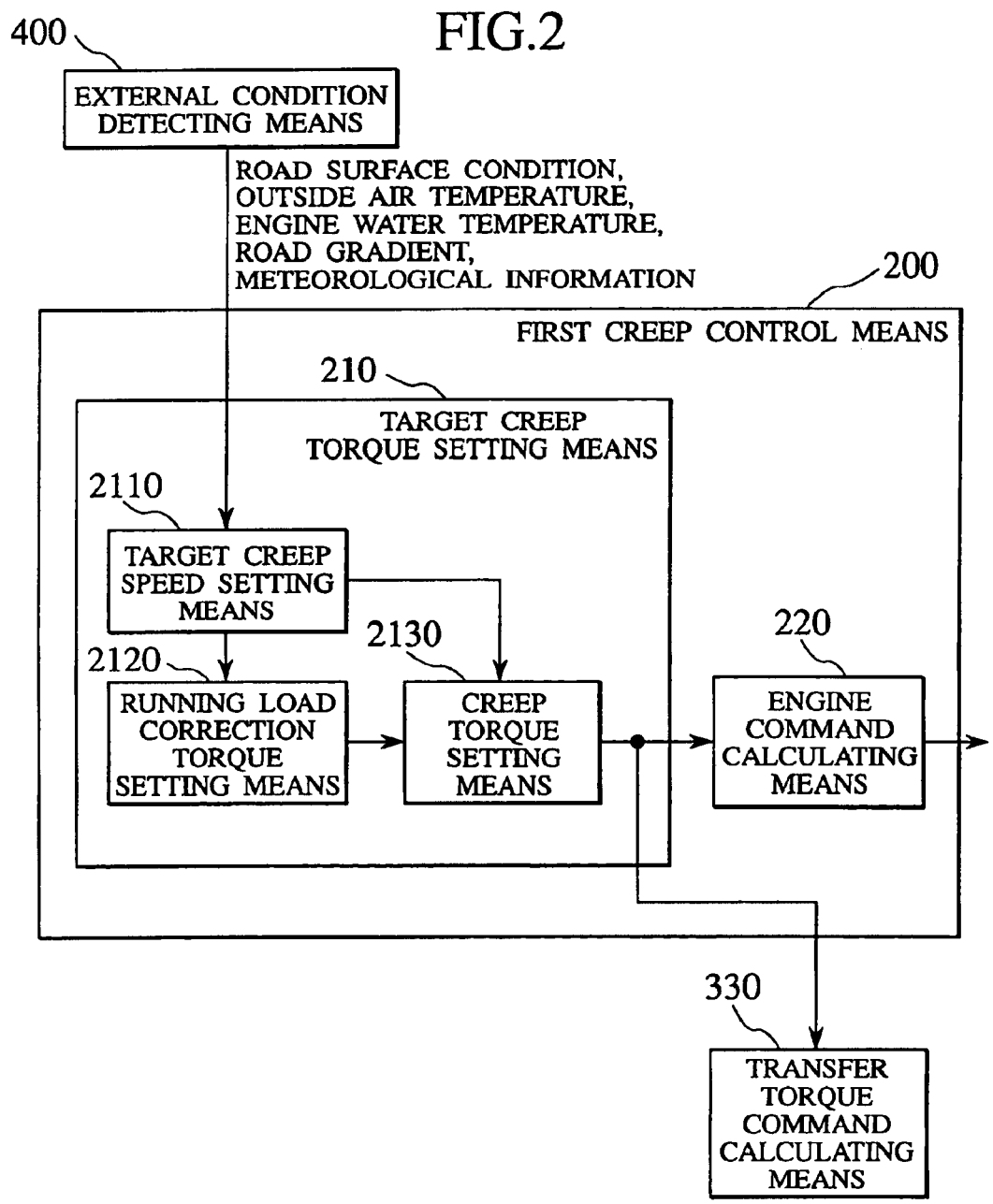
FIG. 2 is a block diagram of a first creep control means shown in FIG. 1.

FIG. 2 is a control block diagram showing an example of the first creep control means 200 used in the vehicular creep controlling method and system according to the present invention. The first creep control means 200 is composed of a target creep torque setting means 210 and an engine command calculating means 220. The target creep torque setting means 210 is composed of a target creep speed setting means 2110, a running load correction torque setting means 2120, and a creep torque setting means 2130.

The target creep speed setting means 2110 sets a vehicular target creep speed from the start of creep until creep running. That is, this target creep speed is a speed pattern which rises upon establishment of the foregoing creep start condition, then increases gradually as a function of time and reaches a predetermined value. As to this target creep speed, therefore, a certain speed pattern may be stored beforehand in a database and then read out, but more preferably it can be altered according to running environments. For example, one of preset plural creep speed patterns may be selected from among such information pieces as road surface condition, outside air temperature, engine water temperature, road gradient, and meteorological information. By so doing, against changes in road environment and external environment, it is possible to realize a creep running which is difficult to slip on a snow-covered road, while on a dry road it is possible to let the creep speed increase rapidly, thus permitting a stable creep to be attained. For example, when it is judged that a road surface is easy to slip, such as snow-covered road surface, on the basis of meteorological information and weather history information provided from a navigation system and outside temperature, it is possible to select a target creep speed wherein an increase of speed from the start of creep is gentle to prevent the torque at the time of starting creep from becoming too large. It is also possible to judge the state of the engine 1 from water temperature information of the engine and then alter the creep speed pattern.

Once the target creep speed is set in the target creep speed setting means 2110, a creep torque for realizing the target creep speed is calculated in the creep torque setting means 2130. For example, the creep torque setting means 2130 calculates a required acceleration on the basis of the target creep speed and further calculates a drive torque necessary for driving the vehicle on the basis of the calculated acceleration and the vehicular inertia. From this required drive torque and from the final gear ratio, transmission gear ratio and gear efficiency it is possible to calculate a torque which the engine 1 should generate. Further, it is possible to calculate a running resistance of the vehicle from the creep speed and vehicular data, obtain a drive torque for the vehicular running resistance from the same resistance, and calculate a required torque to be generated by the engine 1 for the vehicular running resistance. In this way the torque to be generated by the engine 1 can be calculated from both target creep speed and vehicular data. Actually, since the vehicle weight varies depending on payload and the number of passengers, there may occur a case where accurate vehicular data are not obtained or there may occur a change in running load caused by a road slope. Therefore, with only the creep torque calculated from the target creep speed, it is impossible to realize the target creep speed. For this reason, a creep torque correction quantity is calculated in the running load correction torque setting means 2120. On the basis of the creep speed set in the target creep speed setting means 2110 and a creep torque correction value calculated in the running load correction torque setting means 2120, a final creep torque is calculated in the creep torque setting means 2130.

In the running load correction torque setting means 2120 there is calculated a creep torque correction value which becomes necessary due to a road slope and changes in payload and the number of passengers. For calculating the creep torque correction value there may be adopted a method wherein a creep torque correction quantity is calculated from the target creep speed set in the target creep speed setting means 2110 and the actual vehicular creep speed. For example if the actual creep speed is lower than the set target creep speed, it can be judged that the creep speed is deficient, while when the actual creep speed is higher, it can be judged that the creep torque is excessive. On the basis of such a judgment result, the running load correction torque setting means 2120 set a creep torque correction quantity and outputs it to the creep torque setting means 2130. For calculating the creep torque correction quantity there may adopted, in combination with the above method, a method wherein a road gradient is detected and a torque correction quantity for the road gradient is calculated directly. The creep torque set by the creep torque setting means 2130 is outputted to the engine command calculating means 220 and is also outputted to the transfer torque command calculating means 330 in the second creep control means 300.

FIG. 3 is a control block diagram showing an example of the target creep speed setting means 2110 illustrated in FIG. 2. For example, on the basis of information provided from the external condition detecting means 400 the speed pattern selecting means 21110 selects a target creep speed best suited for the current condition from a set speed pattern database 21120. Alternatively, it is also possible to select a speed pattern predetermined as default. In the set speed pattern database 21120 are stored plural target creep speeds 21121~21123, from which a suitable target creep speed is selected according to a running environment.

The target creep speeds (speed patterns) stored in the database 21120 include such speed patterns as graphically shown in the lower portion of FIG. 3. For example, a set speed pattern as normal or default is assumed to be a set speed B. These speed patterns rise upon establishment of the foregoing creep start condition. The creep speed increases gradually as a function of time from the start of creep and converges to a predetermined certain creep speed (a constant value). For example, when it is judged by the external condition detecting means 400 that the road surface is apt to slip, there is selected a target creep speed wherein an increase of speed at the time of starting of creep suppressed like a set speed A. There also is a speed pattern wherein a finally converged creep speed is set low like a set speed C. Speed patterns not described here may be stored.

Figure 4:
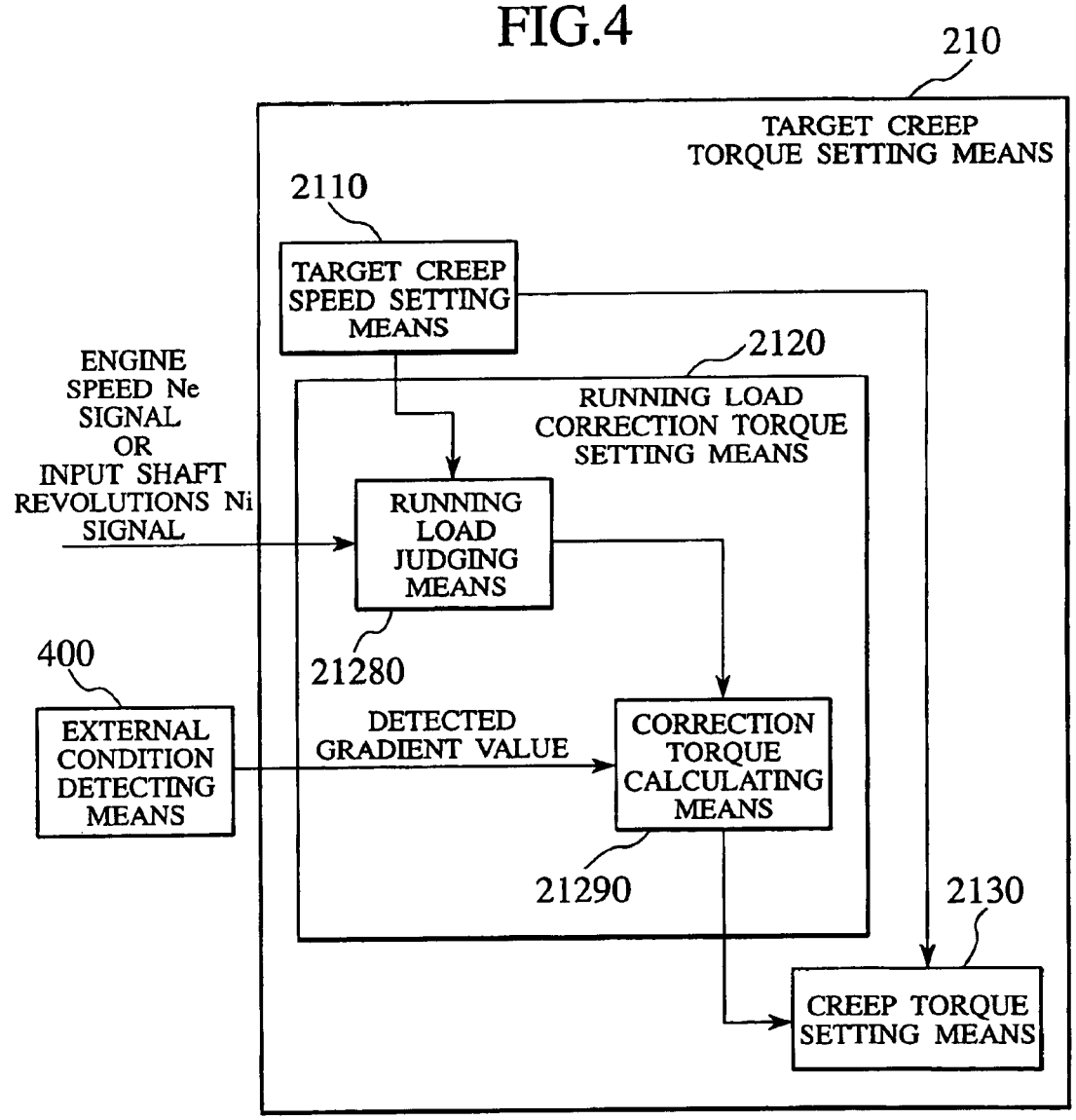
FIG. 4 is a block diagram of a running load correction torque setting means shown in FIG. 2.

FIG. 4 is a control block diagram showing an example of the running load correction torque setting means 2120 illustrated in FIG. 2. A running load judging means 21280 inputs the target creep speed set in the target creep speed setting means 2110 and the engine speed or the number of revolutions of the input or output shaft in the transmission and judges a state of change in the running load. For example, in case of using the number of revolutions of the output shaft in the transmission and the target creep speed, a vehicle speed can be calculated from the number of revolutions of the output shaft in the transmission, the final reduction gear ratio and tire radius in the vehicle. Therefore, from the target creep speed and the calculated vehicle speed it is possible to judge whether the actual vehicle speed is lower or higher than the target creep speed. If the actual vehicle speed is lower than the target creep speed, it is possible to judge that the running load is large, while if the actual vehicle speed is lower than the target creep speed, it can be judged that the running load is small. Thus, the state of running load can be judged from the difference between the vehicle speed and the target creep speed. Further, if the difference between the actual vehicle speed and the target creep speed is within a predetermined value, it is more preferable to judge that there is no change in running load.

In case of using the number of revolutions of the input shaft in the transmission, the change in running load can be judged in the same way as in the case of the number of revolutions of the output shaft in the transmission if the gear ratio in the transmission is taken into account. In case of using the engine speed, if the engine speed is lower than a predetermined number of revolutions, it is possible to judge that the running load is large, while if the engine speed is higher than the predetermined number of revolutions, it can be judged that the running load is small. Thus, by detecting the actual number of revolutions on the vehicle side it is possible to judge a change in running load.

Once the running load is judged in the running load judging means 21280, a creep torque correction quantity corresponding to the change in running load is calculated in a correction torque calculating means 21290 in order to correct the creep torque quantity in accordance with the change in running load. For example, the running load judging means 21280 can set a predetermined creep torque correction quantity on the basis of whether the change in running load is larger or smaller than a predetermined value.

There also is a method wherein the creep torque correction quantity is calculated as a function of magnitude of the change in running load. Further, when the change in running load is within a predetermined value, the calculation of the torque correction quantity may be omitted and it is possible to prevent a hunting phenomenon of the vehicle speed.

The correction torque calculating means 21290 may correct the creep torque on the basis of, say, a gradient detection result provided from the external condition detecting means 400 together with the running load judgment result obtained in the running load judging means 21280. That is, the torque required for the vehicle to attain a target creep speed on a flat road and the torque required for the vehicle to attain a target creep speed on a slope are different. On an uphill a larger creep torque than on a flat road is required, while on a downhill a small creep torque suffices. Such creep torques different according to gradients can be calculated in the correction torque calculating means 21290 on the basis of gradient detection results provided from the external condition detecting means 400. In this case, the creep torque can be corrected feed-forwardwise and hence it is possible to remedy a response delay of the creep torque. Even without a signal from the external condition detecting means 400, a change in running load can be detected feedbackwise from a number-of-revolutions signal by the running load judging means 21280 and a creep torque correction quantity can be calculated in the correction torque calculating means 21290. In this case, it is not necessary to newly add a gradient detecting sensor and there can be realized a stable creep control easily.

When a creep torque correction quantity is larger than a predetermined value, it is judged to be an excessive creep torque. In this case, a value of the creep torque correction quantity is controlled to be lower than the predetermined value set for the creep torque correction quantity in advance.

The creep torque correction quantity calculated in the correction torque calculating means 21290 is outputted to the target creep torque setting means 2130. When calculating a target creep torque on the basis of the target creep speed provided from the target creep speed setting means 2110, the target creep torque setting means 2130 takes into account the creep torque correction quantity calculated in the correction torque calculating means 21290. In this way a required creep torque can be calculated correspondingly to a road slope and a change in vehicle weight.

The target creep speed setting means 2110 can not only set a target creep speed of the vehicle as described above but also set target patterns of the number of revolutions of the input shaft and that of the output shaft in the transmission. This is because the vehicle speed and the number of revolutions of the output shaft are in a proportional relation to each other and likewise the vehicle speed and the number of revolutions of the input shaft in the transmission are also in a proportional relation in accordance with the transmission gear ratio.

Figure 5:
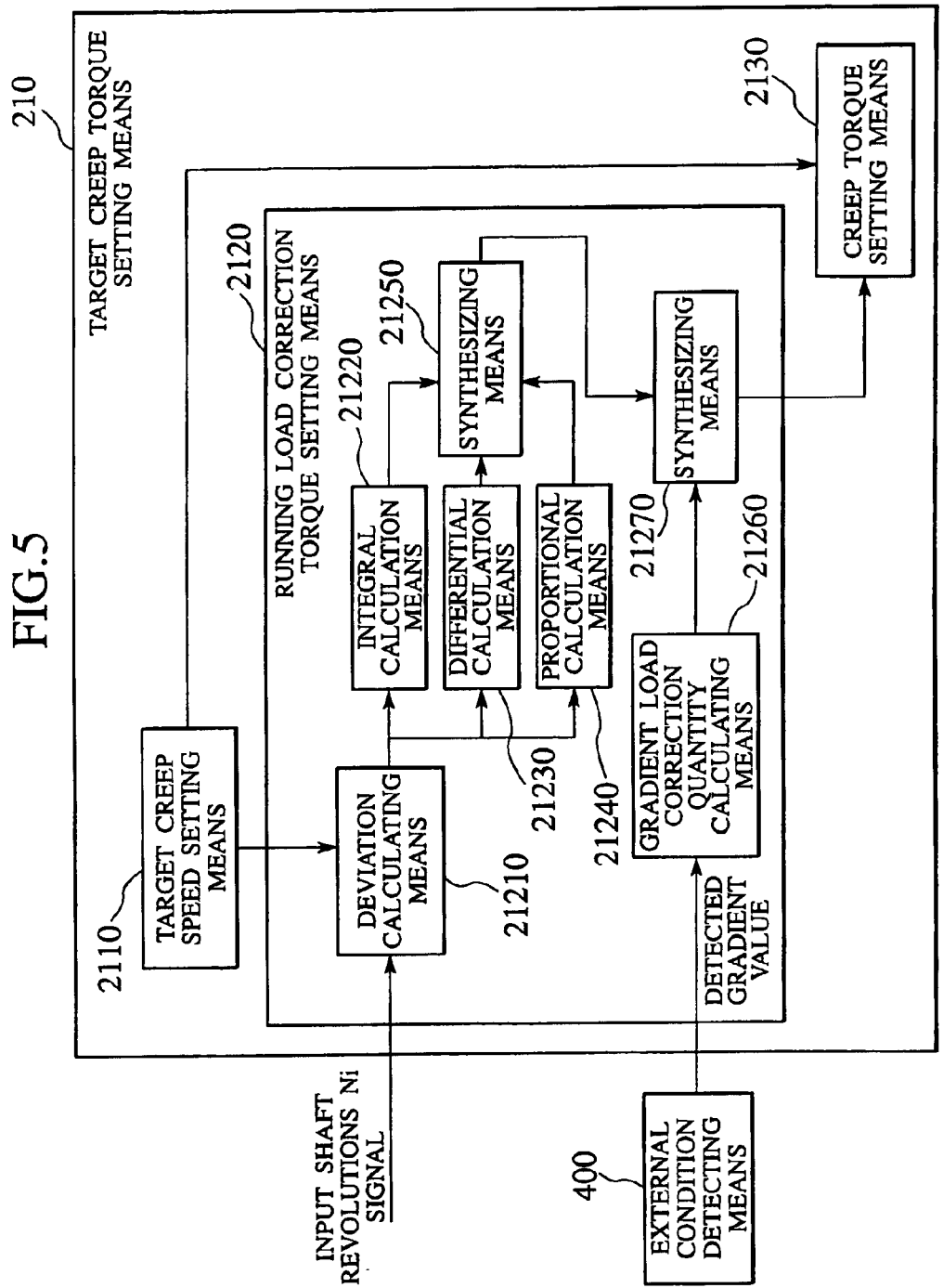
FIG. 5 is a block diagram of another running load correction torque setting means.

FIG. 5 is a control block diagram showing another example of the running load correction torque setting means 2120 in the target creep torque setting means 210. A deviation calculating means 21210 calculates a speed deviation on the basis of the target creep speed provided from the target creep speed setting means 2110 and an input shaft number-of-revolutions signal. For example, in the case where a target value of target creep number-of-revolutions at the number of revolutions of the input shaft in the transmission is outputted from the target creep speed setting means 2110, the deviation calculating means 21210 calculates a deviation between the actual number of revolutions of the input shaft in the transmission and the above target creep number-of-revolutions. Where the target creep speed is set in terms of a vehicle speed, the actual vehicle speed can be calculated from the number of revolutions of the input shaft, transmission gear ratio, vehicular final reduction ratio, and tire radius, so there is calculated a deviation between the target creep speed in terms of speed of the vehicle and the actual creep speed. In FIG. 5, the number of revolutions of the input shaft is inputted.

The speed deviation calculated in the deviation calculating means 21210 is inputted to an integral calculation means 21220, a differential calculation means 21230, and a proportional calculation means 21240. The processing which is here performed is the same as the so-called PID arithmetic processing in control and a correction torque quantity against a change in running load is calculated by PID arithmetic processing on the basis of the speed deviation from the target value. The calculation result obtained is outputted to a synthesizing means 21250, in which, for example, addition and subtraction are performed. The synthesizing means 21250 outputs the result of the addition and subtraction to a second synthesizing means 21270.

On the other hand, a gradient load correction quantity calculating means 21260 inputs, for example, the gradient detection result obtained in the external condition detecting means 400 and calculates a creep torque correction quantity which is required according to the present road gradient. For example, if the road is an uphill, the required creep torque increases by an amount corresponding to an increase in the vehicular running load caused by the gradient. This increasing torque is calculated by the gradient load correction quantity calculating means 21260. Also in the case of a downhill in an advancing direction of the vehicle, a decrease of required creep torque is calculated on the basis of the same way of thinking. The advancing direction of the vehicle is judged from a range operation of the driver.

The second synthesizing means 21270 calculates a final creep torque correction quantity from the calculation result obtained in the synthesizing means 21250 and the result obtained in the gradient load correction quantity calculating means 21260. This final creep torque correction quantity is outputted to the target creep torque setting means 2130 to correct the target creep torque.

It is possible to restrict the creep torque correction quantity obtained from the synthesizing means 21250 so that it is maintained within the predetermined value, thereby avoiding an excessive creep-state running caused by a creep speed error. For example, when a step such as a protrusion is present ahead of the vehicle, the synthesizing means 21250 operates to calculate a creep torque correction quantity required to run on the protrusion. However, an applied load decreases at the moment when the vehicle has gone over, as a result of which the vehicle may be rapidly accelerated. To avoid such a rapid acceleration, an upper limit of the creep torque correction quantity may be set, thereby making it possible to suppress the magnitude of the creep torque correction quantity to be corrected based on a difference between the target creep speed and the actual speed and to calculate the creep torque correction quantity without having an influence of a speed error generated locally.

Even in a construction not using the gradient load correction quantity calculating means 21260, the creep torque correction quantity against the gradient load can be calculated in the section from the deviation calculating means 21210 up to the synthesizing means 21250. However, the use of the gradient load correction quantity calculating means 21260 permits the attainment of a more stable creep because a load change against a gradient change can be reflected feed-forwardwise in the correction of creep torque.

Figure 6:
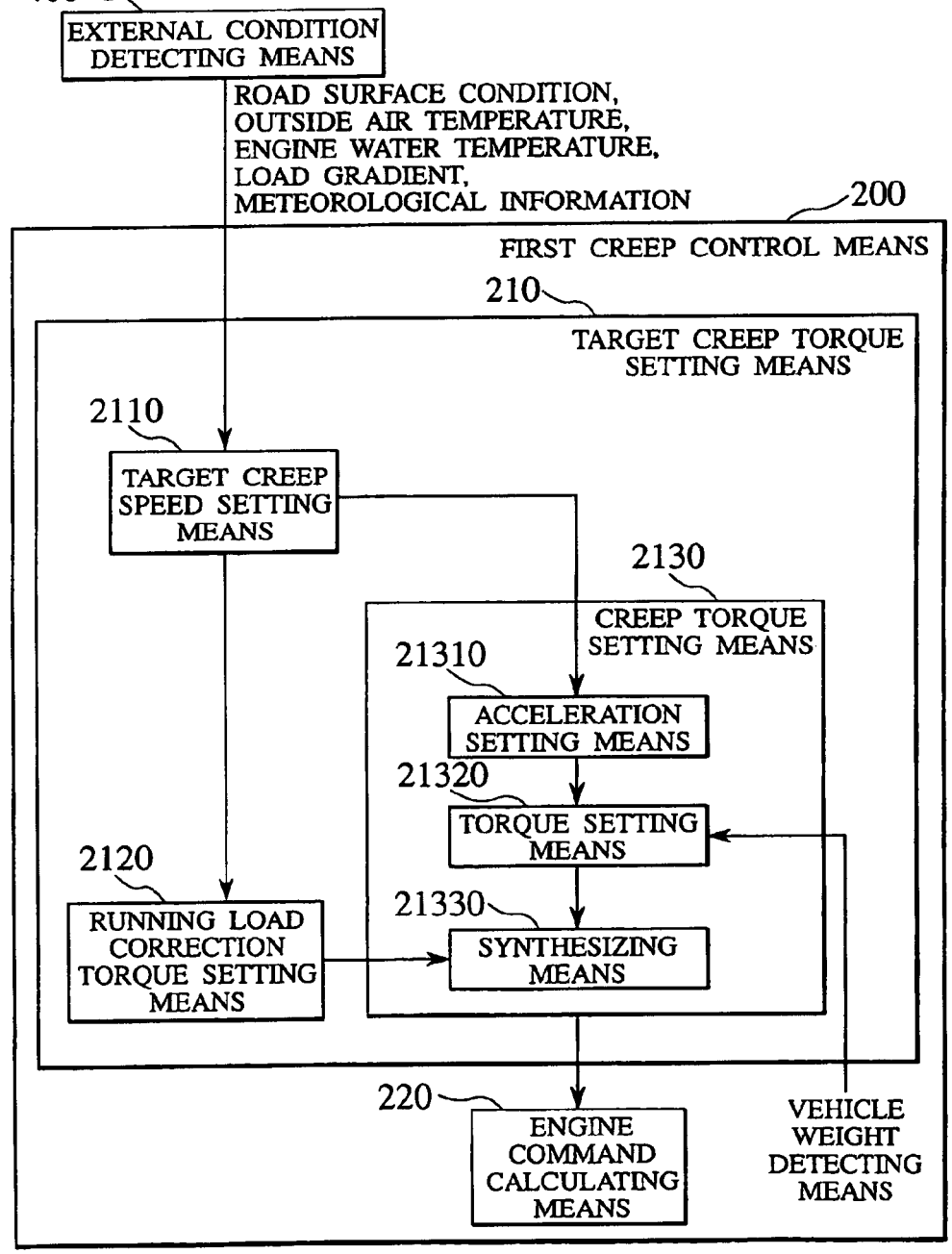
FIG. 6 is a block diagram of a creep torque setting means.

FIG. 6 is a control block diagram showing an example of the creep torque setting means 2130 in the target creep torque setting means 210. An acceleration setting means 21310 calculates an acceleration pattern necessary to realize the target creep speed which is outputted from the target creep speed setting means 2110. For example, there is a method wherein a target creep acceleration is calculated from a change in target creep speed at a predetermined sampling time. The result of this acceleration calculation is outputted to a torque setting means 21320, in which a torque required for driving the vehicle is calculated from the acceleration calculation result and the vehicular inertia. That is, a vehicle driving torque necessary for realizing the calculated acceleration is calculated from the vehicular inertia. The torque calculated in the torque setting means 21320 becomes an ideal creep torque for realizing the target creep speed at the vehicle weight set on a flat road. The creep torque may be any of a required drive torque at a tire, the torque at the output shaft in the transmission, and the torque at the input shaft in the transmission. The creep torque calculated in the torque setting means 21320 is outputted to a synthesizing means 21330, in which it is combined with the creep torque correction quantity against slope and a change in vehicle weight calculated in the running load correction torque setting means 2120 to afford a final target creep torque.

The target creep torque thus calculated in the synthesizing means 21330 is converted to a target torque in terms of a transmission input shaft torque. The target torque is then outputted to the engine command calculating means 220, in which there is calculated a command to be issued by the engine 1.

Figure 7:
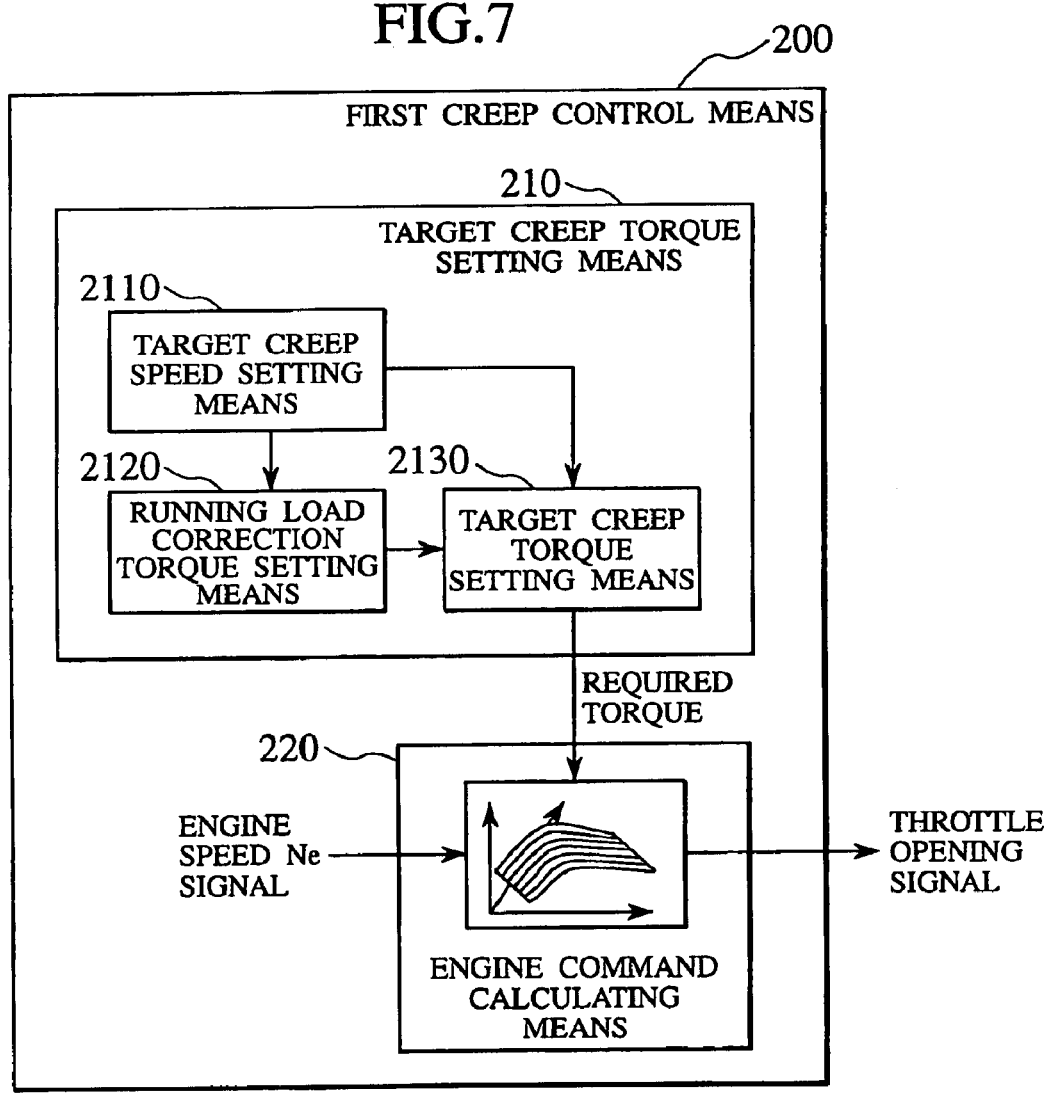
FIG. 7 is a block diagram of an engine command calculating means.

FIG. 7 is a control block diagram showing an example of the engine command calculating means 220. The engine command calculating means 220 calculates a throttle opening on the basis of the target torque of the engine 1 outputted from the target creep torque setting means 2130 and the engine speed signal Ne and outputs it to the engine controller 28. In this way the throttle opening is adjusted and the target torque is realized in the engine 1. To calculate the throttle opening there may be adopted a method in which the calculation is performed by map retrieval using a map of engine speed, throttle opening and engine torque.

As to the engine speed signal inputted to the engine command calculating means 220, for example the current engine speed in real time may be inputted. Alternatively, a preset target engine speed may be inputted. In this case, an engine speed corresponding to the creep speed in a steady state at the target creep speed may be used as the target engine speed. The number of revolutions in idling may be used as the target engine speed.

Figure 8:
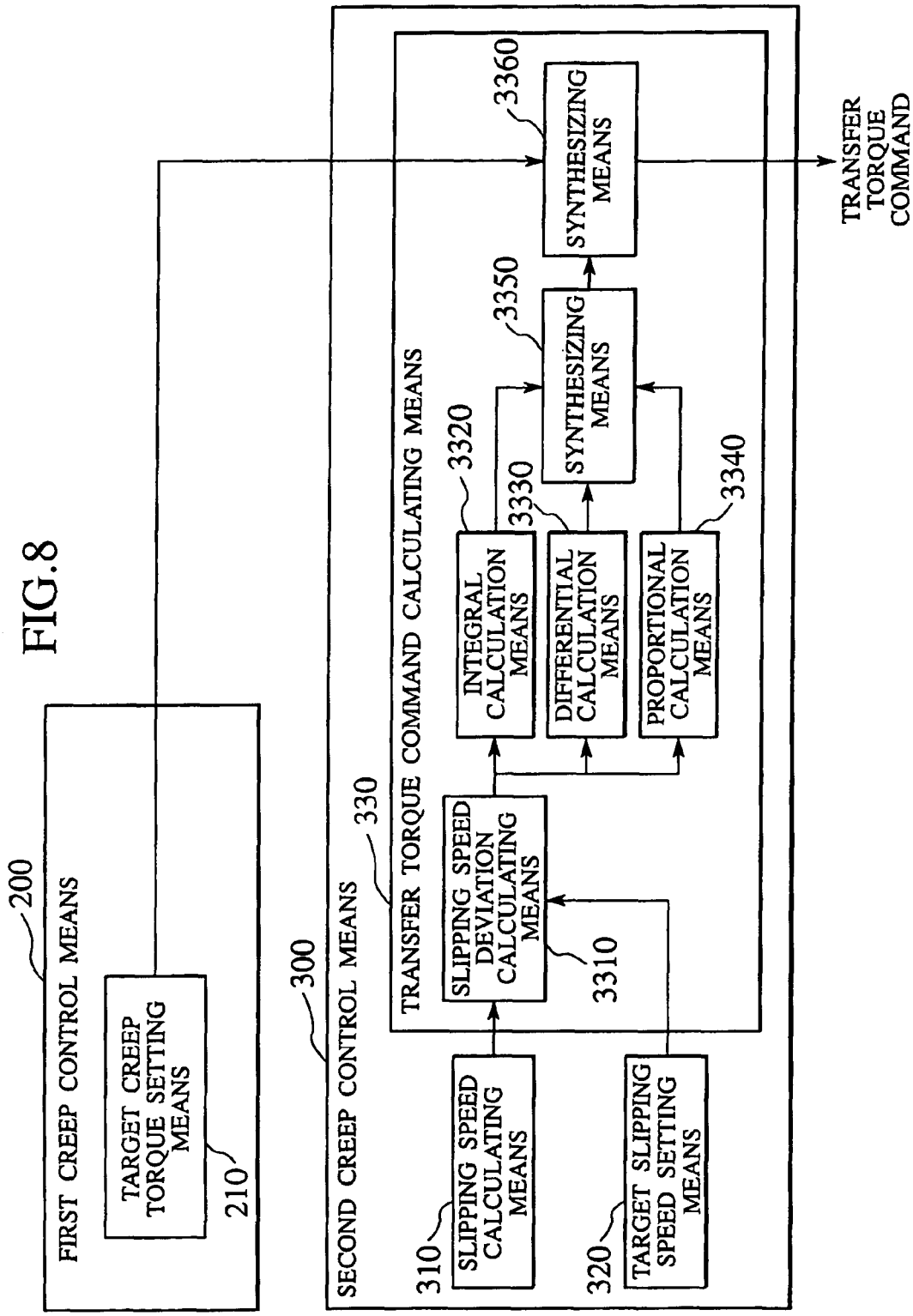
FIG. 8 is a block diagram of a transfer torque command calculating means.
Figure 12A:
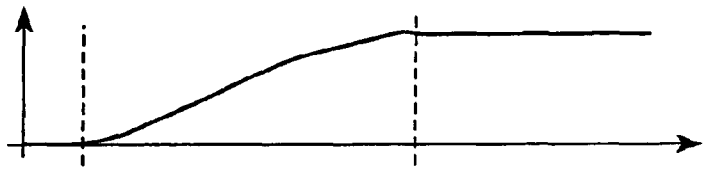
FIGS. 12 A–H are time charts of creep controlling operations according to the present invention.
Figure 12B:
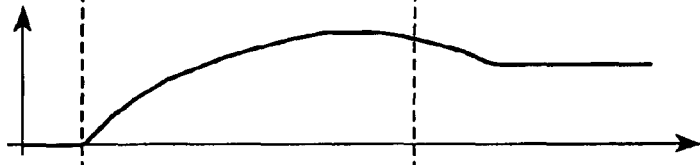
Figure 12C:
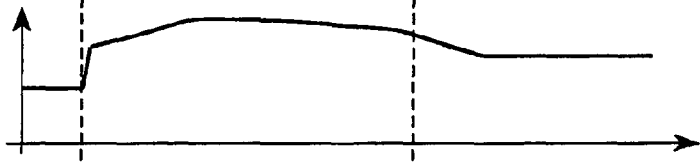
Figure 12D:
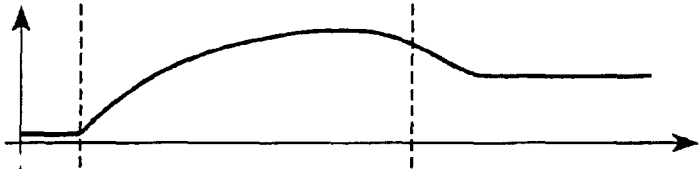
Figure 12E:
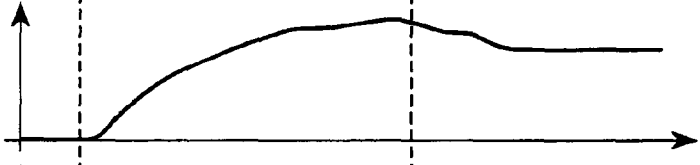
Figure 12F:
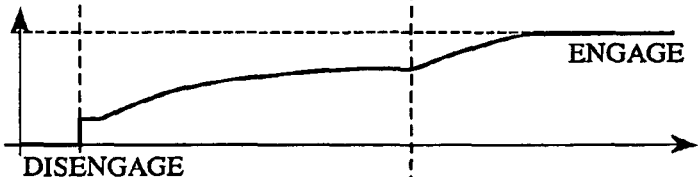
Figure 12G:
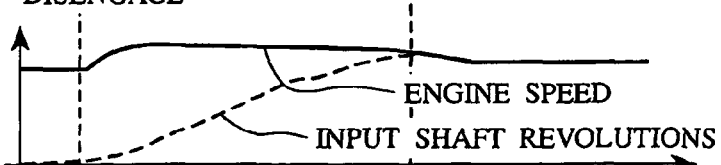
Figure 12H:
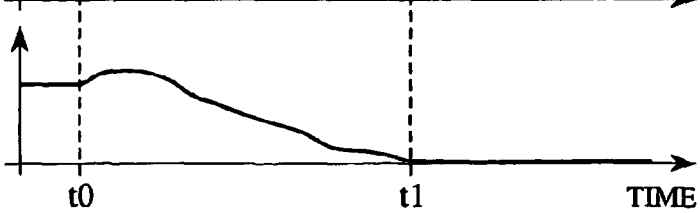
Figure 13A:
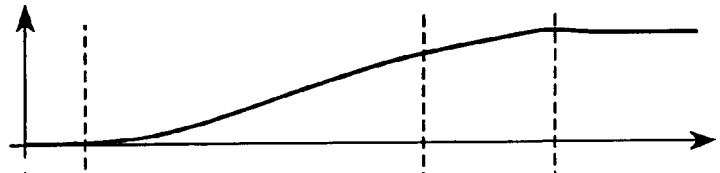
FIGS. 13 A–H are time charts of creep controlling operations according to the present invention.
Figure 13B:
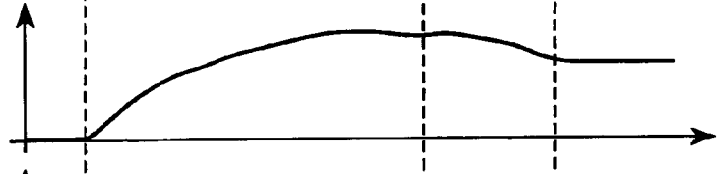
Figure 13C:
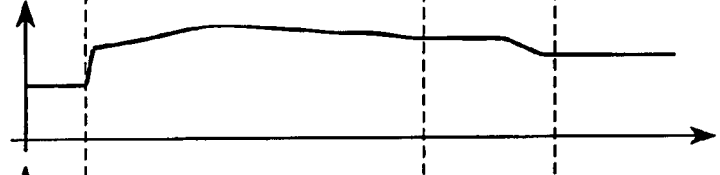
Figure 13D:
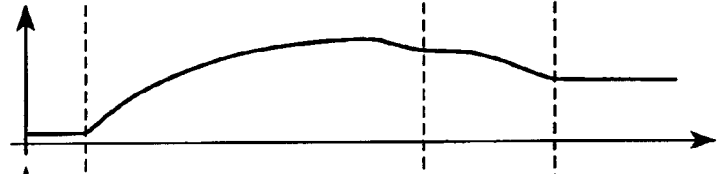
Figure 13E:
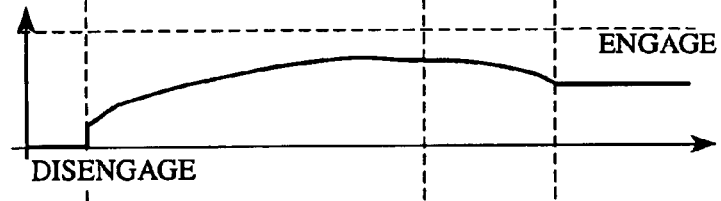
Figure 13F:
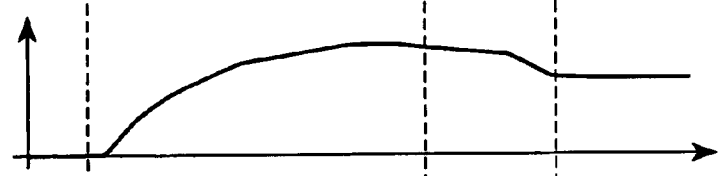
Figure 13G:
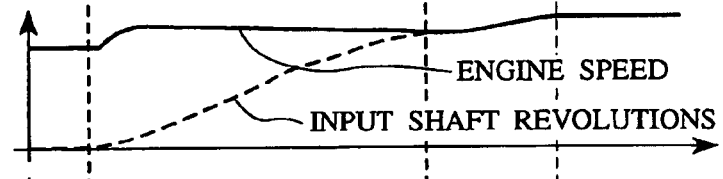
Figure 13H:
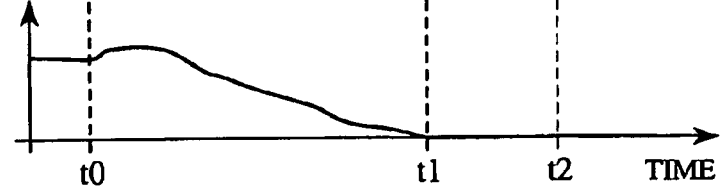

FIG. 8 is a control block diagram showing an example of the transfer torque command calculating means 330 in the second creep control means 300. A slipping speed deviation calculating means 3310 calculates a slipping speed deviation from the slipping speed (a speed difference between the input-side rotational speed and the output-side rotational speed) of the friction clutch 5 calculated in the slipping speed calculating means 310 and also from the target slipping speed set by the target slipping speed setting means 320. As in FIG. 5, this slipping speed deviation is outputted to an integral calculation means 3320, a differential calculation means 3330 and a proportional calculation means 3340. The results of these arithmetic operations are outputted to a synthesizing means 3350 and are combined therein by addition and subtraction. In a synthesizing means 3360, the target creep torque calculated by the target creep torque setting means 210 in the first creep control means 200 and the calculation result obtained in the synthesizing means 3350 are combined and a final transfer torque command for the friction clutch 5 is calculated. For the calculation in the synthesizing means 3360 there may be adopted a method wherein the target creep torque calculated in the target creep torque setting means 210 and the calculation result obtained in the synthesizing means 3350 are simply added together.

Since the target creep torque and a deviation between the slipping speed of the friction clutch 5 and the target slipping speed are used in the transfer torque command calculating means 330, even in the event the transfer torque characteristic changes, this change in the characteristic can be corrected automatically. Consequently, not only a stable creep can be realized, but also the slipping speed of the friction clutch 5 is controlled, whereby the wear of the clutch can be suppressed.

FIG. 9 is a control block diagram showing an example of the target slipping speed setting means 320 illustrated in FIG. 8. In a slipping speed pattern selecting means 3110, for example a slipping speed pattern of the friction clutch 5 best suited to the current condition is selected from a slipping speed pattern database 3120 on the basis of information provided from the external condition detecting means 400. Alternatively, a slipping speed pattern predetermined as default may be selected. In the slipping speed pattern database 3120 are stored plural slipping speed patterns 3121~3123, from which a suitable friction clutch slipping speed pattern is selected according to the running environment.

The slipping speed patterns stored in the slipping speed pattern database 3120 are such slipping speed patterns as graphically shown in the lower portion of FIG. 9. In the graph shown in the lower portion of FIG. 9, for example a normal or default slipping speed pattern is assumed to be a slipping speed C. As shown in the same figure, speed patterns are set from the time when creep starts, and the target slipping speed of the friction clutch 5 is gradually decreased from the start of creep and is converged to zero. For example, when it is judged by the external condition detecting means 400 that the road surface is apt to slip, there is selected a target slipping speed pattern wherein the amount of decrease in slipping speed from the start of creep is small like a slipping speed A shown in the lower portion of FIG. 9. Moreover, there is a pattern setting such that the target slipping speed is decreased abruptly like a slipping speed B, there is a case where the target value of a final slipping speed is not converged to zero like a slipping speed D, and there further is such a slipping speed pattern as delays the convergence to zero slipping speed. Such target slipping speed patterns as are not described here may be stored in the database 3120.

FIG. 10 is a time chart an example of creep controlling operations according to the present invention. In the same figure, solid lines represent a case where there is a change in running load, e.g., creep running on an uphill, while dot-dash lines represent a case where there is no change in running load.

Creep running is started at time t0. At the target creep speed shown in FIG. 10(A), the same creep running is set irrespective of with or without a change in running load. In this example, for such a target creep speed, the target creep torque is changed according to with or without a change in running load, as shown in (B). Particularly, without direct detection of a running load, a running load is judged from both target creep speed and vehicle speed and the target creep torque is corrected. As a result, as shown in (C) and (D), the throttle opening is adjusted to control the engine torque according to the target creep torque. At the same time, the transfer torque of the friction clutch 5 is also controlled according to the target torque, as shown in (E) and (F). The transfer torque of the friction clutch 5 is controlled also on the basis of the slipping speed of the clutch independently of with or without a change in running speed. As a result, it is possible to effect a creep running independently of with or without a change in running load.

The details of operation will now be described. Upon occurrence of the foregoing creep condition, creep control (running) is started from time t0. In this case, there accrues an effect that the creep control processing is not created during normal running. Once creep control (running) is started at time t0, first as shown in (A), there is set a target creep speed for increasing the speed from zero gradually up to a predetermined creep speed. Once the target creep speed is set, there is calculated a target creep torque (B) for the vehicle to realize this target speed. The target creep torque comprises an acceleration torque component calculated from both a change in target creep speed and the vehicular inertia and a torque component for maintaining the vehicular running against the running resistance of the vehicle. From time t0 to t1 in (B), the target creep torque increases with both acceleration torque component for attaining the target creep speed and the torque component for the running resistance. Subsequent to time t1 there exists only the torque component for the running resistance and the target creep torque decreases and converges to a predetermined certain value.

Torque control is performed so that the engine 1 realizes the target creep torque. In (C), as an example of means for effecting torque control for the engine 1, the throttle opening is controlled. As shown in the same figure, from the creep running start time t0 the throttle valve is opened so as to realize the target creep speed. At time t1, the target creep torque decreases, so that the throttle valve is closed a little accordingly. As a result, there is generated such en engine torque as shown in (D). Reference to this figure shows that when the torque of the engine 1 is controlled by the throttle valve, the engine torque responds with a delay relative to a change in throttle opening. Therefore, when controlling the engine torque by throttle opening so as to realize the target creep torque, it is preferable that the throttle opening be controlled earlier taking the delay in response into account, as shown in (C).

(E) shows a transfer torque of the first friction clutch 5, in which a control is made so that the vehicle realizes the target creep torque of (B). In (F) there is shown a pressing force of the friction clutch 5. The friction clutch 5 generates a transfer torque with a clutch pressing force, and with this pressing force it is possible to control the transfer torque. As shown in (E), when creep running is started from time t0, the transfer torque of the friction clutch 5 is increased on the basis of the target creep torque. At this time, as shown in (F), the pressing force of the clutch 5 increases in the direction of the engaged state of clutch from the disengaged state of clutch. When the target creep speed converges to the target speed at time t1, the target creep torque decreases. Consequently, the transfer torque of the friction clutch 5 also decreases and is thereafter controlled so as to realize the target creep torque for the running resistance. Once creep running is started at time t0, the pressing force of the friction clutch 5 increases stepwise. This is because the friction clutch 5 is released completely while the vehicle stops. Upon start of creep running, the transfer torque is controlled by the friction clutch 5. If the friction clutch 5 is released completely during stop of the vehicle, drag of the clutch disappears and the load torque to the engine 1 side decreases. This is advantageous in point of fuel economy. Releasing the friction clutch 5 completely and waiting for the start of creep is advantageous also for the purpose of decreasing wear of the clutch.

(G) shows the number of revolutions on the input side (engine speed) and the number of revolutions on the output side (the number of revolutions of the input shaft in the transmission) in the friction clutch 5. Up to time t0 at which creep running is started, the number of revolutions of the engine 1 corresponds to idling speed and the number of revolutions of the input shaft in the transmission is zero. Once creep running is started at time t0, the torque of the engine 1 is controlled in accordance with the target creep torque and the transfer torque of the friction clutch 5 is also controlled on the basis of the target creep torque. As a result, torque is transmitted to the input shaft of the transmission, so that the number of revolutions of the input shaft in the transmission increases gradually. The number of revolutions of the input shaft in the transmission corresponds to the vehicle speed and is controlled in accordance with the target creep speed. The number of revolutions on the input side of the transmission increases in accordance with the target creep speed and, in the vicinity of convergence of the target creep speed at time t1, is synchronized with the number of revolutions of the engine 1 and becomes the same number of revolutions. Thereafter, the creep speed is realized in the synchronized state of both the number of revolutions of the engine and that of the input shaft in the transmission. In this case, there occurs such a change in the number-of-revolutions difference as shown in (H), in which the difference in the number of revolutions between the input side and the output side of the friction clutch 5, i.e., the slipping speed of the friction clutch, decreases from the creep running start time t0 and becomes zero at time t1. This slipping speed is controlled with the transfer torque of the friction clutch 5 so as to keep substantially the same slipping speed during creep running on the basis of the target slipping speed, whereby it is possible to keep the wear of the friction clutch 5 to a minimum. It is also possible to set the target slipping speed so as to make zero the slipping speed of the friction clutch 5 during creep running. Therefore, also during a long-time creep running, there can be attained a creep running free from slipping of the friction clutch 5 can be effected, thus making it possible to diminish wear and heat generation of the friction clutch.

The number of revolutions of the engine 1 is determined from the difference between the torque generated in the engine and a load torque which is a reaction from the transfer torque of the friction clutch 5. Therefore, if the torque of the engine 1 and the transfer torque of the friction clutch 5 are equally controlled, the number of revolutions of the engine is controlled for example in the vicinity of the idling speed without undergoing any change. In the case where the transfer torque of the friction clutch 5 is small or the engine torque is large, the torque acts to increase the engine speed. At this time, the transfer torque of the friction clutch 5 is controlled so that the slipping speed of the clutch becomes the target slipping speed, so that the transfer torque of the friction clutch increases to suppress an increase in the number of revolutions of the engine 1. At this time, if the engine torque is large, an increase in the transfer torque of the friction clutch 5 results in the creep speed becoming high relative to the target creep speed. Consequently, the target creep torque is corrected so as to realize the target creep speed. As a result, the torque command of the engine 1 and the transfer torque command of the friction clutch 5 are corrected and the vehicle runs so as to realize the target creep speed.

Conversely, when the transfer torque of the friction clutch 5 is large or when the torque of the engine 1 is small, the transfer torque of the friction clutch also transfers an inertia torque of the engine, so that the engine speed decreases. In this case, the slipping speed of the friction clutch 5 becomes lower than the target slipping speed and therefore the friction clutch is controlled so as to decrease the transfer torque. Where the engine torque is small, the vehicle speed may decrease as a result of the above control. In this case, the target creep torque is corrected so as to realize the target creep speed. As a result, the torque command of the engine 1 and the transfer torque command of the friction clutch 5 are corrected, so that the vehicle runs so as to realize both target creep speed and target slipping speed.

Thus, the transfer torque of the first friction clutch 5 is corrected on the basis of the slipping speed of the same clutch, and the target creep torque is corrected on the basis of both target creep speed and actual vehicle speed. By so doing, not only when there occurs a change in running load but also when there occurs a control error with respect to the engine torque or the transfer torque of the friction clutch 5, control is made automatically so as to realize the target creep speed and target slipping speed. Thus, under any condition it is possible to realize a stable creep running while suppressing wear of the friction clutch 5.

FIG. 11 is a time chart showing a conventional example of creep running in which creep control is realized with only the first friction clutch 5. As in FIG. 10, the presence of a running load is indicated with a solid line, while the absence of a running load is indicated with a dot-dash line. In the same figure, creep running is started from time t0. In the case where a running load can be detected, a target creep torque is changed depending on with or without a change in running load, as shown in (B). However, as shown in (C) and (D), the engine torque is not controlled in accordance with the target creep torque, but irrespective of with or without a change in running load, the same throttle opening is operated to control the engine torque. On the other hand, as in (E) and (F), the transfer torque of the friction clutch 5 is controlled in accordance with the target torque. But, as the transfer torque of the friction clutch 5 is controlled in accordance with a change in running load, the inertia torque of the engine 1 is consumed and the engine speed decreases. Although an idling speed control acts on the engine 1, it cannot cope with a large change in running load and there is the possibility that engine stall will occur. Consequently, the transfer torque of the friction clutch cannot be made sufficiently large, and there sometimes occurs a case where the transfer torque of the friction clutch 5 cannot be controlled on the basis of the slipping speed of the clutch. As a result, as shown in (G) and (H), the slipping speed of the friction clutch 5 cannot be controlled and it is possible that creep running will be continued in the presence of the slipping speed.

Thus, if creep running is performed with the friction clutch 5 alone, the creep speed changes in response to a change in running load and it is very likely that a uniform creep running may be infeasible.

FIG. 12 is a time chart showing another example of operations in creep running according to the present invention. In this example, the pressing force of the friction clutch 5 is different from that in FIG. 10. More specifically, in FIG. 10 the transfer torque of the friction clutch 5 is controlled constantly during creep running. But in this example, after the slipping speed has become zero, the pressing force shown in (F) is fixed to its maximum value so that the friction clutch 5 is engaged completely, whereby creep running is realized at a stable constant speed. When shifting to normal running by stepping on the accelerator pedal from this creep running, if the friction clutch 5 is left completely engaged, the shift to normal running can be done without generating slip of the friction clutch.

FIG. 13 is a time chart showing a further example of creep control operations according to the present invention. In FIGS. 10 and 12 referred to earlier creep running is started at time t0, then at time t1 shift is made to creep running at a constant speed and at the same time the slipping speed of the friction clutch 5 is controlled. In the example of FIG. 13 the slipping speed of the friction clutch 5 is controlled in an early stage to zero. Although the slipping speed of the friction clutch 5 is controlled to zero up to time t1, the target creep speed shown in (A) does not reach a steady value yet. Thereafter, at time t2 shift is made to a constant creep speed. Thus, the slipping speed of the friction clutch 5 can be controlled separately from creep running and thus it is possible to further suppress the wear of the friction clutch.

FIG. 14 is a time chart showing a still further example of creep control operations according to the present invention. In this example, the completely engaging technique for the friction clutch 5 described in connection with FIG. 12 is applied to the example shown in FIG. 13. A difference from FIG. 13 resides in only the pressing force of the friction clutch 5 shown in (F). It is apparent that this example possesses the functions and effects illustrated in FIGS. 12 and 13.

FIG. 15 is a flow chart showing an example of a processing flow according to the present invention. This flow chart is repeated at every predetermined sampling time, for example, at every 0.01 second period. At a predetermined sampling period, processing is started with creep running judgment start (S0) as trigger. First, a check is made to see if the selection of a shift range operating means 24 is present or not in a shift range for which running is not required such as neutral or parking (S1). If a shift range (neutral or parking) which does not require running is selected, the flow returns to the creep running judgment start (S0). If the selected shift range is a shift range for which running is required, a check is made to see if brake, such as foot brake or side brake, is actuated or not (S2). If the answer is affirmative, the flow returns to the creep running judgment start (S0). On the other hand, if the answer is negative, a check is made to see if the accelerator pedal is operated or not (S3). If the answer is affirmative, this means that the driver is requesting the start of the vehicle through the accelerator, so it is judged that creep running is not requested, and the flow returns to the creep running judgment start (S0). When the accelerator pedal is not operated, it is judged that creep running is requested, and creep running is performed (S4). In the execution of creep running, first a target creep torque is calculated (S5). Next, an engine torque command is calculated on the basis of the target creep torque calculated (S6). Further, a transfer torque command of the friction clutch 5 is calculated on the basis of the target creep torque (S7). Then, the torque of the engine 1 is controlled in accordance with the engine torque command (S8) and the transfer torque of the friction clutch 5 is controlled in accordance with the transfer torque command of the friction clutch (S9). Next, the flow returns to the creep running judgment start (S0), waiting for the next sampling timing, and processing is repeated again from the selection range judgment (S1).

The target transfer torque command calculating step S7 for the friction clutch 5 may be carried out in the following manner. First a target slipping speed of the friction clutch 5 is set (S7-1) and then an actual slipping speed of the friction clutch is calculated (S7-2). Lastly, a target transfer torque of the friction clutch 5 is calculated from all of the target creep torque calculated in step S5, the target slipping speed and the actual slipping speed (S7-3).

Figure 16:
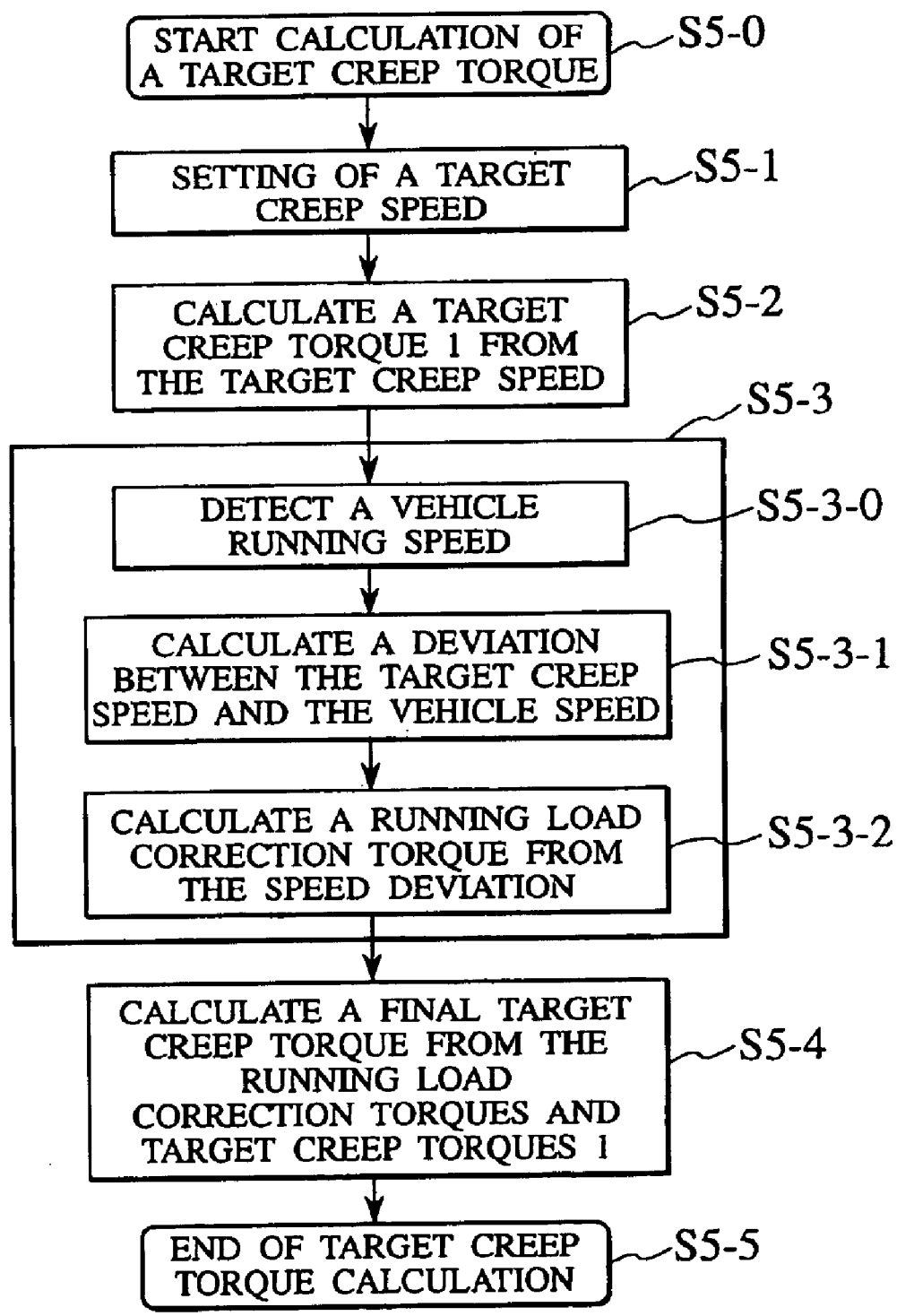
FIG. 16 is a flow chart of a target creep torque calculating process according to the present invention.

FIG. 16 is a flow chart showing an example of the target creep torque calculating process S5 illustrated in FIG. 15. When the target creep torque calculation is started (S5-0), first a target creep speed is set (S5-1). Next, a target creep torque 1 is calculated on the basis of the set target creep speed (S5-2). Then, there is calculated a running load correction torque for correcting the target creep torque against a change in running load (S5-3). Next, a final target creep torque is calculated from both running load correction torque and target creep torque 1 (S5-4). Calculation of the target creep torque is now over (S5-5).

Step S5-3 may calculate the running load correction torque in the following manner. First, a vehicular running speed is detected for correcting the target creep torque against a change in running load (S5-3-0). Next, there is calculated a deviation between the target creep speed and the detected vehicular running speed (S5-3-1). Lastly, a running load correction torque based on the change in running load is calculated from the speed deviation calculated in S5-3-1 (S5-3-2).

Figure 17:
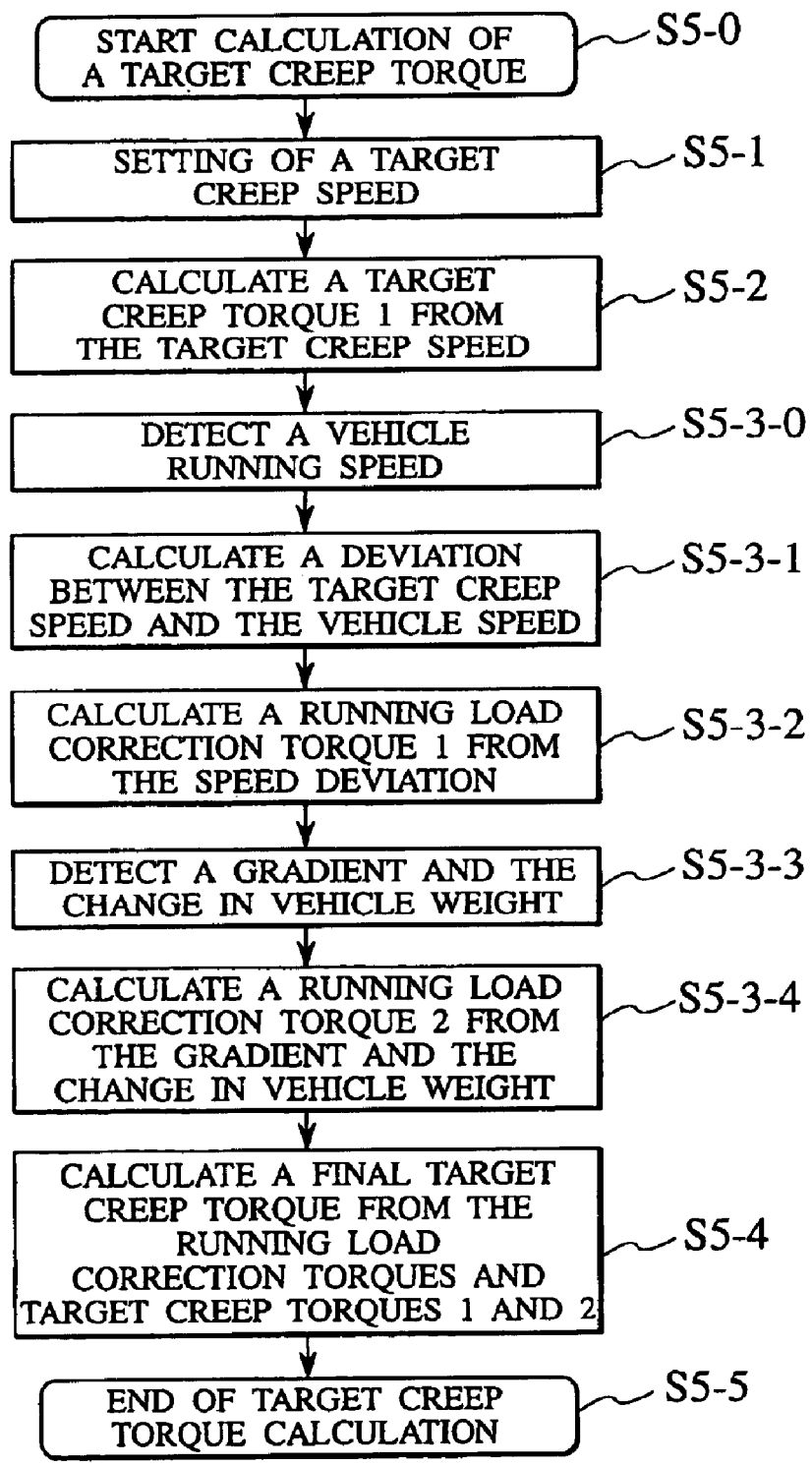
FIG. 17 is a flow chart of a creep control processing according to the present invention.

FIG. 17 is a flow chart showing another example of a vehicular creep control processing according to the present invention, with modifications added to FIG. 16. The difference from FIG. 16 lies in the steps from S5-3-3 to S5-4. More specifically, a road slope or a change in vehicle weight is detected by the external condition detecting means 400 (S5-3-3). Next, there is calculated a running load correction torque 2 based on the road slope or the change in vehicle weight (S5-3-4). Lastly, a final target creep torque is calculated from all of the running load correction torques 1 and 2 and the target creep torque 1 (S5-4).

Figure 18:
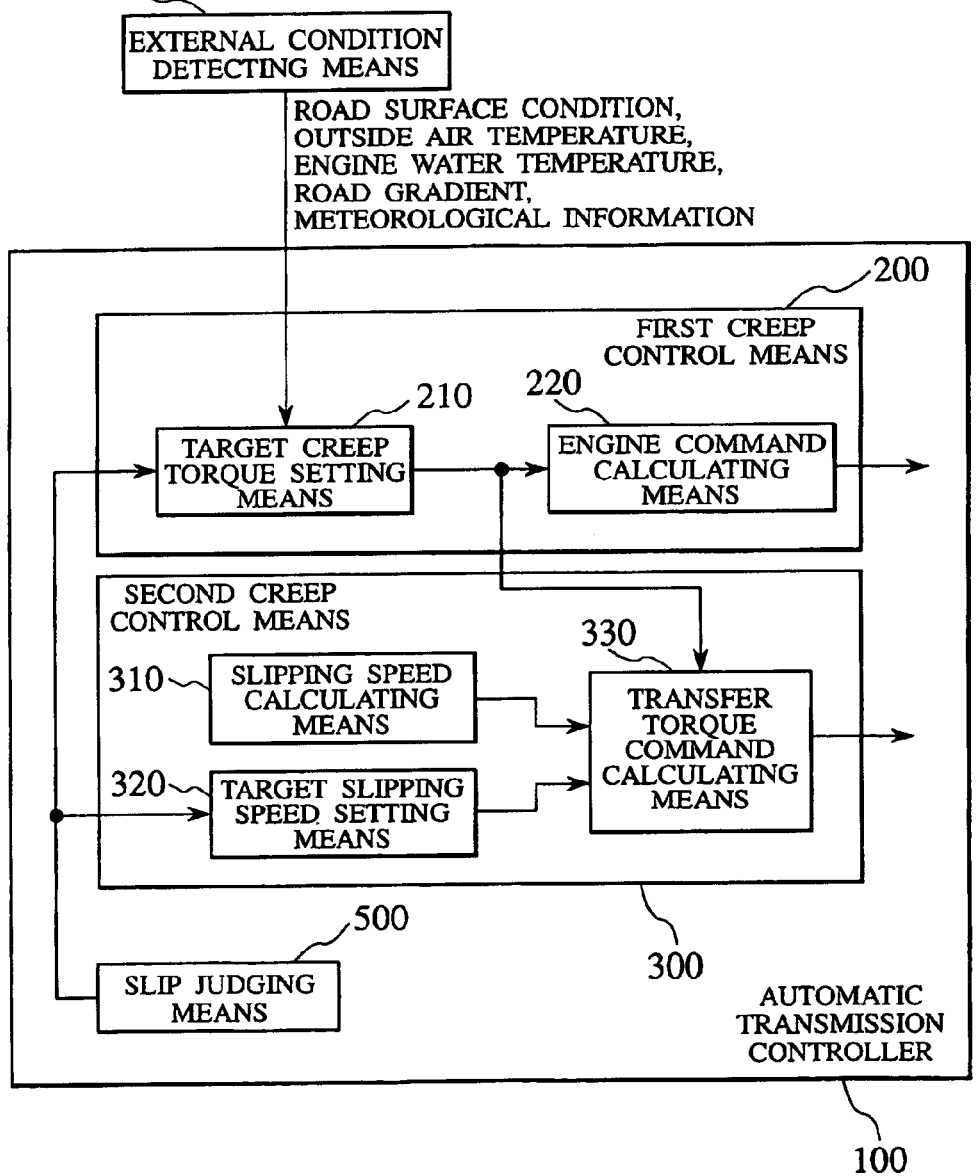
FIG. 18 is a control block diagram according to the present invention.

FIG. 18 is a control block diagram further embodying the present invention, in which a slip judging means 500 is added to the automatic transmission controller 100. The slip judging means 500 judges a slip condition of the vehicle at the time of start of creep running or during creep running. For slip judgment there may be adopted, for example, a method wherein actual vehicle speed and tire rotating speed are detected and a slip condition of the vehicle is judged by utilizing a difference between the two speeds. For example, there may be adopted a method which utilizes a difference in rotational speed between plural tires, such as a method wherein rotational seeds of the vehicular front and rear wheels are detected and if the difference therebetween is not smaller than a predetermined value, it is judged that there exists a slip condition. There also may be adopted a method using a ground speed sensor or the like. When the slip judging means 500 judges a slip condition, it outputs the slip condition to both first creep control means 200 and second creep control means 300. In the first creep control means 200, the target creep torque command is corrected. For example, there is made a correction such as decreasing the creep torque or decreasing it to zero in accordance with the vehicular slip condition. After the target creep torque has been corrected by the target creep torque setting means 210, the engine command calculating means 220 and the transfer torque command calculating means 330 in the second creep control means 300 correct the torque command of the engine 1 and the transfer torque command in the friction clutch 5.

As a result, if the vehicular slip condition is eliminated, the target creep torque setting means 210 again corrects the target creep torque. Thus, on the basis of the vehicular slip judgment result, the target creep torque in slip condition is corrected and there can be corrected both torque of the engine 1 and transfer torque of the friction clutch 5 at a time. Consequently, in the event of occurrence of a slip condition, there can be realized a stable creep or stop without making the vehicular slip redundant.

The slip condition judgment result obtained in the slip judging means 500 is also fed to the target slipping speed setting means 320 in the second creep control means 300. In the target slipping speed setting means 320, the target slipping speed of the friction clutch 5 is corrected on the basis of the slip condition judgment result. An effective correction is, for example, changing the target slipping speed in a gentle manner, keeping the target slipping speed constant, or increasing the target slipping speed. When the target creep torque is suppressed, for example set to zero, by slip judgment, the target slipping speed of the friction clutch 5 is increased or held as it is at the same time to suppress the transfer torque of the friction clutch, whereby the drive torque for the tires is suppressed to avoid the occurrence of slip. In the event a very small slip is occurring, the target creep torque is made small and the target slipping speed of the friction clutch 5 is corrected into a gentle change, whereby an abrupt torque transfer is avoided to suppress the slip and there can be realized a gentle creep running.

Figure 19:
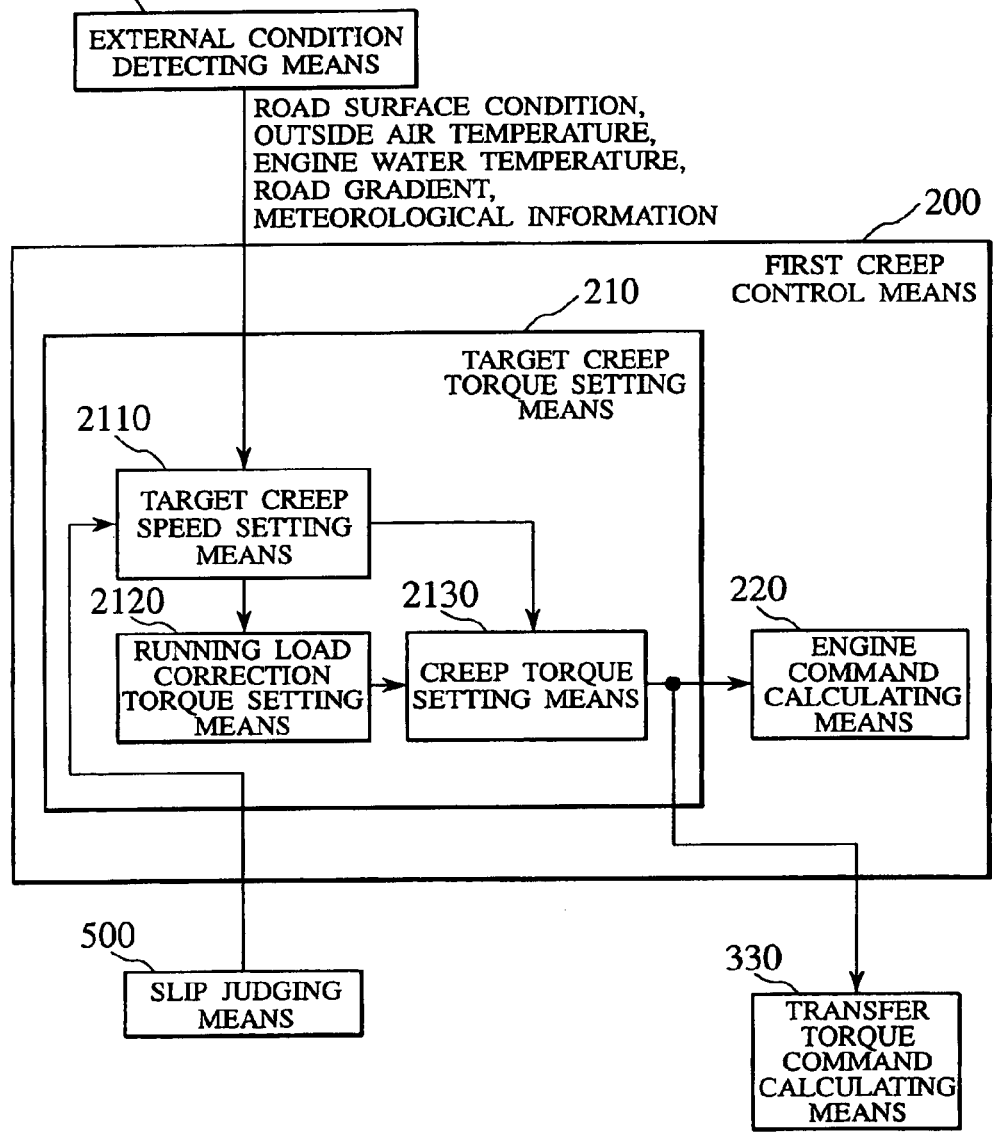
FIG. 19 is a control block diagram according to the present invention.
Figure 21A:
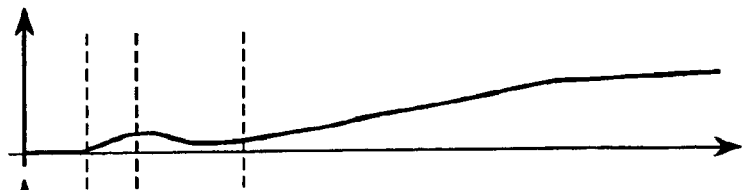
FIGS. 21 A–H are time charts of creep controlling operations according to the present invention in the event of slip of a vehicle.
Figure 21B:
Figure 21C:
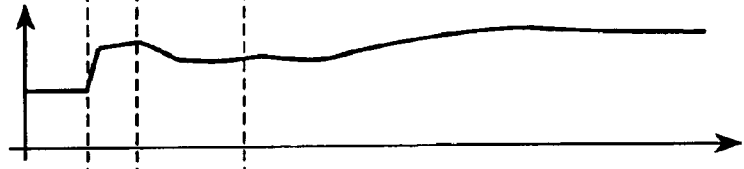
Figure 21D:
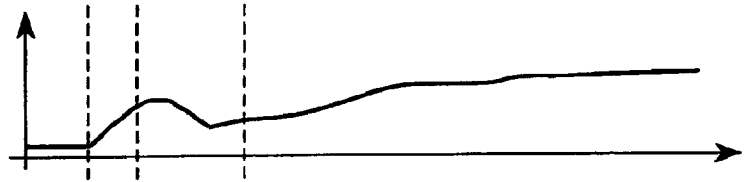
Figure 21E:
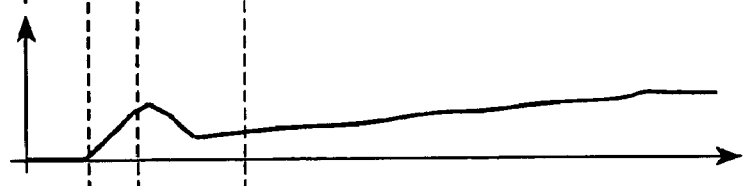
Figure 21F:
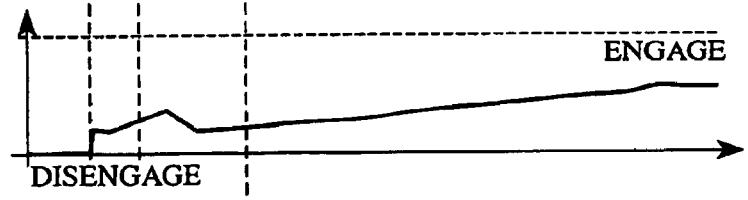
Figure 21G:
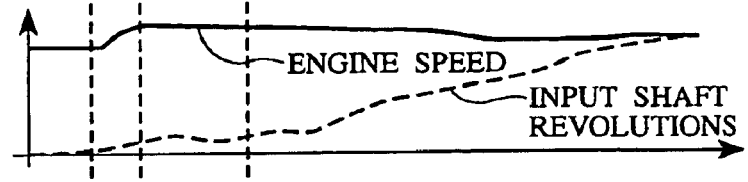
Figure 21H:
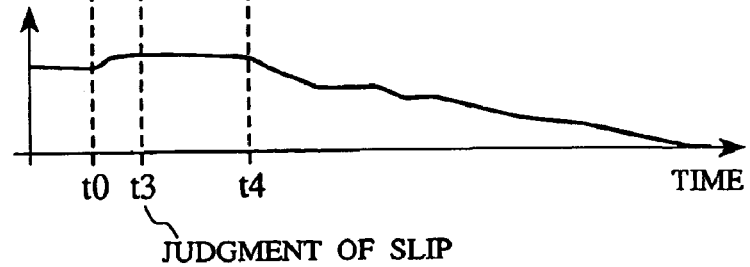

FIG. 19 shows an example of the slip judging means 500 and the target creep torque setting means 210 both illustrated in FIG. 18. An output of the slip judging means 500 is fed to a target creep speed setting means 2110, in which the target creep speed is altered or corrected. For example, the target creep speed is corrected to zero or is corrected so as to diminish a change in creep speed. On the basis of this corrected target creep speed a target creep torque is calculated in a creep torque setting means 2130 and creep control is made.

In this example, by correcting the target creep speed on the basis of the slip judgment result, the creep torque is decreased and operation is performed so as to avoid a slip condition. Therefore, from both wheel rotating speed (the number of revolutions of the output shaft in the transmission) and target creep speed there is made control so as to suppress an excessive slip condition and there can be realized a stable creep running.

FIG. 20 shows another example of the target creep speed setting means and the target slipping speed setting means. The vehicular slip judgment result obtained in the slip judging means 500 is fed to both speed correcting means 21130 and slipping speed correcting means 3130. A speed pattern selected by a speed pattern selecting means 21110 is corrected on the target creep speed setting means 2110 side. As a result, when slip judgment is made by the slip judging means 500, a correction is made into such a target creep speed as avoids a slip condition. For the correction there may be adopted, for example, any of such methods as ① setting the target creep speed low, ② making a change in the target creep speed small, ③ correcting the creep speed to zero and again increasing the creep speed lower than the set value, and ④ setting the target creep speed to zero to stop creep running. There also may be adopted a method wherein speed patterns for slip condition are also stored in a set speed pattern database 21120 and the speed correcting means 21130 causes the speed pattern selecting means 21110 to select a speed pattern for slip condition.

Likewise, on the target slipping speed setting means 310 side, upon receipt of vehicular slip information from the slip judging means 500, the speed pattern selected in the slipping speed pattern selecting means 3110 is corrected. As a result, a correction is made into such a slipping speed of the friction clutch 5 as avoids a slip condition. It is preferable that the target slipping speed be corrected in accordance with the target creep speed corrected in the target creep speed setting means 2110. But there may be adopted a method wherein the slipping speed is maintained without converging the target slipping speed to zero or a method wherein a change in slipping speed is made small. Further, there may be adopted a method wherein slipping speed patterns for slip condition are also stored in the set speed pattern database 3120 and the slipping speed correcting means 3130 causes the slipping speed pattern selecting means 3110 to select a slipping speed pattern for slip condition.

FIG. 21 is a time chart of creep control operations performed in the event of slip of the vehicle according to the present invention. This figure as a whole, including (A) to (H), shows the same elements as in FIG. 10 and shows a control result based on slip judgment at time t3 after the start of creep running.

When a vehicular slip is judged at time t3, the target creep speed is corrected downward, as shown in (A). As a result, the target creep torque decreases as in (B) and the throttle valve is closed to decrease the torque of the engine 1 in accordance with the target creep torque as in (C) and (D). Further, the friction clutch 5 operates in its releasing (OFF) direction in accordance with the decrease of the target creep torque in order to decrease the transfer torque of the friction clutch 5 as in (E) and (F). At this time, the target slipping speed of the friction clutch 5 is also corrected, whereby it is maintained or is set to diminish the change thereof. Consequently, as shown in (H), the change in slipping speed of the friction clutch 5 is also suppressed. Thus, upon judgment of a slip condition at time t3, the target creep torque is diminished and the target slipping speed of the friction clutch 5 is adjusted so as to avoid engagement of the clutch, thereby diminishing the drive torque of the vehicle. Thus, even in a state in which slip is likely to occur, operation is performed so as to avoid it.

As a result, the occurrence of slip can be avoided and the creep running operation is performed again from time t4. That is, there is made setting so that the target creep speed increases. In this case, since it has been judged that a slip condition is apt to occur, the target creep running pattern is set so as to create a gentle rise of the creep speed. Once the target creep speed is set again, a target creep torque is set accordingly as in (B) and the throttle opening is controlled so as to generate an engine torque as in (C) and (D). Further, the friction clutch 5 operates in its engaging (ON) direction and the transfer torque is controlled, as shown in (E) and (F).

There also is set a target slipping speed of the friction clutch 5. Here again, since there exists a state which permits easy occurrence of slip, the setting is performed so that the slipping speed of the friction clutch 5 converges gently to zero to avoid an abrupt change in the slipping speed. As a result, as shown in (G) and (H), the friction clutch 5 is gently controlled its slipping speed and operates so as to realize a stable creep running.

Figure 22:
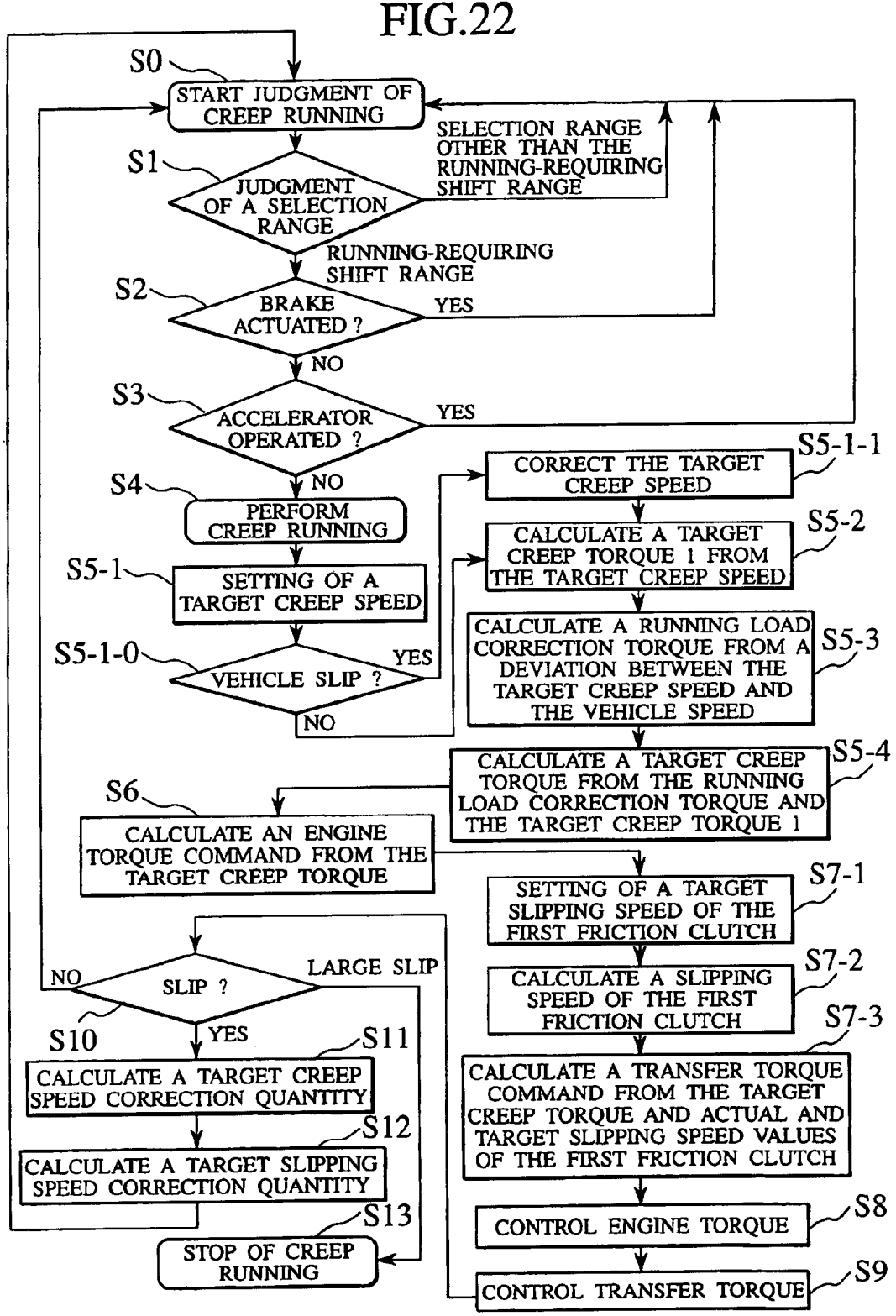
FIG. 22 is a flow chart of a vehicular creep control processing according to the present invention.

FIG. 22 is a flow chart showing a further example of a vehicular creep control processing according to the present invention. This flow chart is the same as FIG. 15 with respect to steps S0 to S4, so repeated explanations will be omitted. When creep running is performed in step S4 in the same way as in FIG. 15, there is set a target creep speed (S5-1). Next, a check is made to see if the vehicle is slipping or not (S5-1-0). If the answer is affirmative, the target creep speed is corrected (S5-1-1) and a target creep torque 1 is calculated from the corrected target creep speed (S5-2). On the other hand, if it is not judged that the vehicle is slipping, the target creep torque 1 is calculated from the target creep speed (S5-2). Next, for correcting the target creep torque against a change in running load, there is calculated a deviation between the target creep speed and a detected vehicular running speed and a running load correction torque based on the change in running load is calculated from the calculated speed deviation (S5-3). Then, a final target creep torque is calculated from both running load correction torque and target creep torque 1 (S5-4). The calculation of the target creep torque is now over and engine torque command is calculated from the target creep torque (S6). Next, a target slipping speed in creep running of the friction clutch 5 is set (S7-1) and an actual slipping speed of the friction clutch is calculated (S7-2). Then, a transfer torque command of the friction clutch 5 is calculated from the target creep torque and the target and actual slipping speeds of the friction clutch 5 (S7-3). On the basis of the above calculations there are performed a torque control for the engine 1 (S8) and a transfer torque control for the friction clutch 5 (S9). As a result, the vehicular slip condition is judged (S10). If it is judged that there is no slip, the flow returns to creep judgment start (S0). If it is judged that there is a vehicular slip and if the slip is larger (Large Slip) than a predetermined slip, a shift is made to the stop of creep running (S13). If the slip occurring in the vehicle is smaller than the predetermined slip, a target creep speed correction quantity is calculated (S11) and there also is calculated a target slipping speed correction quantity for the friction clutch 5 (S12). Thereafter, the flow returns to the creep judgment start (S0).

If there is a periodic control start trigger at the predetermined sampling period, the processing is repeated again from step S1. If the answer was affirmative in step S10 at the last-time control period, a shift is made to step S5-1-1 in the vehicular slip judgment (S5-1-0) at this-time control period. In step S5-1-1 the target creep speed is corrected using the target creep speed correction quantity and the target slipping speed correction quantity calculated in steps S11 and S12, respectively.

Figure 23:
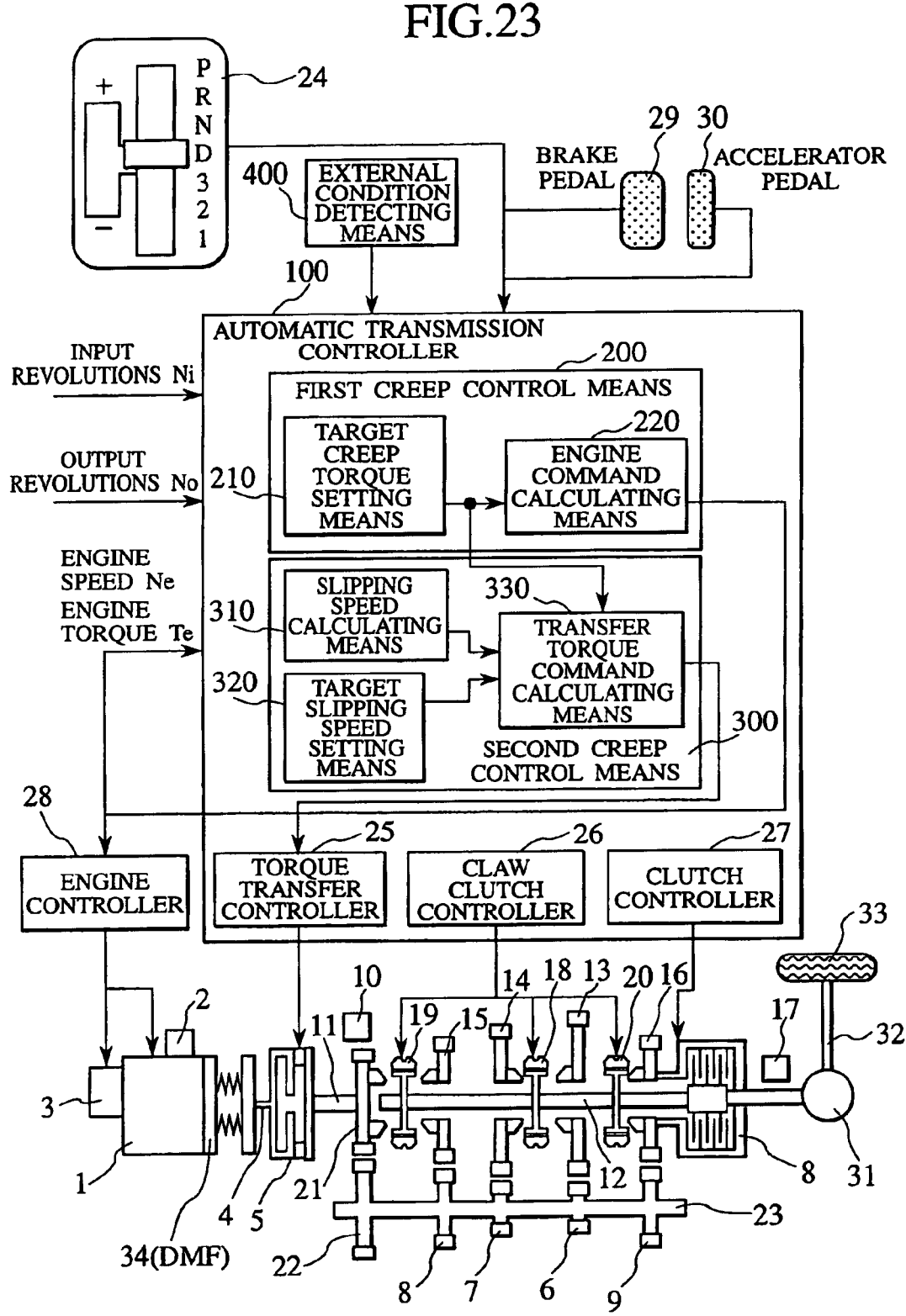
FIG. 23 is an entire construction diagram of a creep control system embodying the present invention.

FIG. 23 is an entire construction diagram of a vehicular creep control system further embodying the present invention. This creep control system is different from that illustrated in FIG. 1 in that a dual mass flywheel (DMF) 34 is used as the flywheel disposed between the engine 1 and the friction clutch 5. In the dual flywheel 34, a flywheel is divided into two inertias and a damping mechanism is disposed between the divided inertias. The dual mass flywheel 34 is used to prevent vibrations and a pulsating torque component generated in the engine 1 from being transmitted to the output side of the friction clutch 5. That is, a torque variation component of a high frequency generated in the engine 1 is damped by the dual mass flywheel 34. As a result, even if creep running is realized in an engaged state of the friction clutch 5, such an offensive vibration component as torque pulsation from the engine 1 is not transmitted to the output side of the friction clutch, so that it is possible to suppress offensive vibration during creep running.

According to the above embodiments of the present invention, the first and second creep torque control means are provided and the torque transfer mechanism (the first friction clutch) is engaged to realize creep running. At this time, even if there occurs a change in running environment (e.g., slope or an increase of payload), it is possible to obtain a required creep torque and realize a stable creep running while preventing wear and an increase in temperature of the clutch. The first creep torque control means is for controlling the engine torque on the basis of a required target creep torque. On the other hand, the second creep torque control means controls the transfer torque of the torque transfer mechanism on the basis of the target creep torque and the difference between the number of revolutions on an input side and that on an output side of the torque transfer mechanism (the first friction clutch) which is disposed between the engine and the transmission.

Moreover, the creep torque control by the engine 1 and the creep torque control by the torque transfer mechanism (the starting clutch and the first friction clutch) are corrected in accordance with a vehicular slip condition and it is thereby possible to realize creep running so as to avoid the occurrence of slip.

According to the present invention, even when there is a change in running environment such as the presence of a slope or a change in payload, it is possible to obtain a required creep torque and realize a stable creep running while suppressing wear and heat generation of the torque transfer mechanism (the first friction clutch).

What is claimed is:

1. A vehicular creep control method, comprising detecting a creep torque generating state, detecting a road condition, deciding a predetermined target creep speed pattern based on said road condition when said creep generating state is detected, and controlling the vehicle speed so as to approach said target creep speed pattern.

2. The method of claim 1, further comprising inputting information on a state of brake operation by a vehicular driver, a state of operation of an accelerator, and a range selection state of a shift lever in a transmission, and wherein said detecting step uses information on the state inputted I said state inputting step, for detecting that the shift lever in said transmission lies in a vehicle running range, that the brake is released, and that the accelerator is not depressed, and then said creep torque is generated.

3. The method of claim 1, wherein said target creep speed pattern deciding step decides the target creep speed pattern in such that the target creep speed rises upon detection of said creep torque generating state, increases with a time lapse, and thereafter becomes a nearly constant value.

4. The method of claim 1, wherein said controlling is such that the number of revolutions on an input side and the number of revolutions on an output side of a transfer mechanism are each within a predetermined value.

5. The method of claim 1, wherein said controlling comprises determining a target torque of a prime mover on the basis of said target creep speed pattern, controlling the torque generated in said prime mover in accordance with said target torque, and controlling a torque transfer mechanism so that the torque generated in said prime mover, which torque has been controlled in accordance with said target torque, is transferred on the basis of the number of revolutions on an input side and the number of revolutions on an output side of said torque transfer mechanism.

6. The method of claim 5, wherein said controlling of said torque transfer mechanism comprises calculating a slipping speed of the torque transfer mechanism from a difference in the number of revolutions between the input side and the output side of the torque transfer mechanism, determining a target slipping speed of the torque transfer mechanism, and controlling the torque transfer mechanism on the basis of said target torque and a deviation between the slipping speed obtained by said calculation and said target slipping speed.

7. The method of claim 6, wherein said controlling of said torque transfer mechanism comprises calculating a target torque in creep running on the basis of said target creep speed pattern, calculating a torque command of the prime mover on the basis of said target torque, a first creep torque control step of controlling the torque of said prime mover on the basis of said torque command obtained by the calculation, the step of calculating the slipping speed of said torque transfer mechanism on the basis of a difference in the number of revolutions between the input side and the output side of said torque transfer mechanism, and a second creep torque control step of controlling the transfer torque of said torque transfer mechanism such that said slipping speed obtained by the calculation approaches a target slipping speed.

8. The method of claim 1, further comprising the steps of detecting slip of the vehicle and correting therefrom said target creep speed.

9. The method of claim 5, further comprising detecting slip of the vehicle and correcting said target creep torque.

10. The method of claim 6, further comprising detecting slip of the vehicle and correcting therefrom said target slipping speed.

11. The method of claim 5, further comprising detecting a change in running load of the vehicle and correcting therefrom said target creep torque.

12. A vehicular creep control system, comprising means for detecting a creep torque generating state, means for detecting a road condition, means for deciding a predetermined target creep speed pattern based on said road condition when said creep torque generating state is detected, and means for controlling the creep torque in such a manner that the vehicle speed approaches said target creep speed pattern.

13. The system of claim 12, wherein said target creep speed pattern deciding means decides the target creep speed pattern such that the target creep speed rises upon detection of said creep torque generating state increases with a time lapse, and thereafter becomes a nearly constant value.

14. The system qf claim 12, wherein said controlling means causes the vehicle speed to approach said target creep speed while maintaining a difference in the number of revolutions between an input side and an output side of a torque transfer mechanism within a predetermined value.

15. The system of claim 12, wherein said controlling means comprises means for determining a target torque of a prime mover based on said target creep speed, means for controlling torque generated in said prime mover in accordance with said target torque, and means for controlling a torque transfer mechanism so that the torque generated in said prime mover and controlled in accordance with said target torque is transferred on the basis of a difference in the number of revolutions between an input side and an output side of said torque transfer mechanism.

16. The system of claim 15, wherein said torque transfer mechanism control means comprises means for calculating slipping speed of said torque transfer mechanism on the basis of the difference in the number of revolutions between the input side and the output side of the torque transfer mechanism, and means for calculating a target slipping speed of said torque transfer mechanism, and said torque transfer mechanism control means controls said torque transfer mechanism on the basis of said target torque and a calculated deviation between said slipping speed and said target slipping speed.

17. The system of claim 12, wherein said creep torque control means comprises a first creep torque control means for calculating a target torque in creep running on the basis of said target creep speed, calculating a torque command of a prime mover on the basis of said target torque, and controlling the torque of said prime mover on the basis of said torque command, and a second creep torque control means for calculating a slipping speed of a torque transfer mechanism on the basis of a difference in the number of revolutions between an input side and an output side of said torque transfer mechanism and controlling a transfer torque of said torque transfer mechanism in such a manner that said slipping speed approaches a target slipping speed.

18. The system of claim 17, wherein said torque transfer mechanism is a friction clutch, and an intermeshing fear transmission is a transmission.

19. A vehicular creep control system comprising an operation state input means which inputs at least one of a state of brake operation by a vehicular driver, a state of operation of an accelerator, and a range, selection state of a shift lever in a transmission, for detecting a creep torque generating state on the basis of the state of operation inputted by said operation state input means, means for detecting a road condition, means for deciding a target creep speed pattern based on said road condition when said creep torque generating state is detected, and means for controlling the creep torque such that the vehicle speed approaches said target creep speed pattern, wherein the creep torque is generated upon detection that the shift lever lies in a vehicle running range, that the brake is released, and that the accelerator is not depressed.

* * * * *